US011914325B2

(12) United States Patent
Hashimoto et al.

(10) Patent No.: US 11,914,325 B2
(45) Date of Patent: Feb. 27, 2024

(54) TONER AND METHOD FOR PRODUCING TONER

(71) Applicant: CANON KABUSHIKI KAISHA, Tokyo (JP)

(72) Inventors: Takeshi Hashimoto, Ibaraki (JP); Kentaro Kamae, Kanagawa (JP); Takeshi Ohtsu, Ibaraki (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/188,041

(22) Filed: Mar. 1, 2021

(65) Prior Publication Data

US 2021/0278774 A1 Sep. 9, 2021

(30) Foreign Application Priority Data

Mar. 5, 2020 (JP) ................................ 2020-037683

(51) Int. Cl.
*G03G 9/087* (2006.01)
*G03G 9/08* (2006.01)

(52) U.S. Cl.
CPC ....... *G03G 9/08755* (2013.01); *G03G 9/0804* (2013.01); *G03G 9/08782* (2013.01)

(58) Field of Classification Search
CPC ............. G03G 9/08755; G03G 9/0804; G03G 9/08782
See application file for complete search history.

(56) References Cited

U.S. PATENT DOCUMENTS

| | | | |
|---|---|---|---|
| 8,084,174 | B2 | 12/2011 | Hasegawa et al. |
| 8,288,069 | B2 | 10/2012 | Fujikawa et al. |
| 8,323,726 | B2 | 12/2012 | Naka et al. |
| 8,921,023 | B2 | 12/2014 | Baba et al. |
| 8,927,188 | B2 | 1/2015 | Naka et al. |
| 8,974,994 | B2 | 3/2015 | Kamae et al. |
| 8,986,914 | B2 | 3/2015 | Fujikawa et al. |
| 9,057,970 | B2 | 6/2015 | Ida et al. |
| 9,058,924 | B2 | 6/2015 | Komatsu et al. |
| 9,063,443 | B2 | 6/2015 | Ishigami et al. |
| 9,075,328 | B2 | 7/2015 | Minagawa et al. |
| 9,152,088 | B1 | 10/2015 | Kobori et al. |
| 9,348,247 | B2 | 5/2016 | Ida et al. |
| 9,348,253 | B2 | 5/2016 | Kanno et al. |
| 9,372,420 | B2 | 6/2016 | Mizo et al. |
| 9,417,540 | B2 | 8/2016 | Hashimoto et al. |
| 9,436,112 | B2 | 9/2016 | Iwasaki et al. |
| 9,540,483 | B2 | 1/2017 | Ida et al. |
| 9,651,883 | B2 | 5/2017 | Hama et al. |
| 9,665,021 | B2 | 5/2017 | Ohtsu et al. |
| 9,665,023 | B2 | 5/2017 | Kamae et al. |
| 9,665,026 | B2 | 5/2017 | Iwasaki et al. |
| 9,671,707 | B2 | 6/2017 | Minagawa et al. |
| 9,696,644 | B2 | 7/2017 | Ida et al. |
| 9,897,934 | B2 | 2/2018 | Tamura et al. |
| 9,915,885 | B2 | 3/2018 | Katsumata et al. |
| 9,969,834 | B2 | 5/2018 | Ohtsu et al. |
| 10,012,918 | B2 | 7/2018 | Ishigami et al. |
| 10,012,920 | B2 | 7/2018 | Shibata et al. |
| 10,012,921 | B2 | 7/2018 | Kamae et al. |
| 10,036,970 | B2 | 7/2018 | Kanno et al. |
| 10,078,281 | B2 | 9/2018 | Ida et al. |
| 10,082,743 | B2 | 9/2018 | Hama et al. |
| 10,088,765 | B2 | 10/2018 | Miyakai et al. |
| 10,133,201 | B2 | 11/2018 | Kamae et al. |
| 10,146,146 | B2 | 12/2018 | Komatsu et al. |
| 10,175,595 | B2 | 1/2019 | Onozaki et al. |
| 10,197,936 | B2 | 2/2019 | Onozaki et al. |
| 10,203,619 | B2 | 2/2019 | Yamashita et al. |
| 10,216,108 | B2 | 2/2019 | Iwasaki et al. |
| 10,228,629 | B2 | 3/2019 | Tamura et al. |
| 10,234,777 | B2 | 3/2019 | Ohtsu et al. |
| 10,274,851 | B2 | 4/2019 | Hashimoto et al. |
| 10,353,312 | B2 | 7/2019 | Kamae et al. |
| 10,401,748 | B2 | 9/2019 | Hashimoto et al. |
| 10,423,086 | B2 | 9/2019 | Hama et al. |
| 10,423,090 | B2 | 9/2019 | Ohtsu et al. |
| 10,451,986 | B2 | 10/2019 | Sano et al. |
| 10,451,990 | B2 | 10/2019 | Kamae et al. |
| 10,474,049 | B2 | 11/2019 | Onozaki et al. |

(Continued)

FOREIGN PATENT DOCUMENTS

| | | | |
|---|---|---|---|
| JP | 2013097321 | A | 5/2013 |
| JP | 2015-135485 | A | 7/2015 |

(Continued)

OTHER PUBLICATIONS

English machine translation of the description of JP2018156074A (Year: 2022).*
Fedors, “A Method for Estimating Both the Solubility Parameters and Molar Volumes of Liquids”, Pol. Eng. Sci., vol. 14, No. 2 (1974) 147-54.
U.S. Appl. No. 17/116,402, Takeshi Hashimoto, filed Dec. 9, 2020.
U.S. Appl. No. 17/117,444, Ichiro Kanno, filed Dec. 10, 2020.
U.S. Appl. No. 17/117,883, Ichiro Kanno, filed Dec. 10, 2020.
U.S. Appl. No. 17/118,960, Masayuki Hama, filed Dec. 11, 2020.
U.S. Appl. No. 17/189,794, Kentaro Kamae, filed Mar. 2, 2021.

*Primary Examiner* — Peter L Vajda
*Assistant Examiner* — Boone Alexander Evans
(74) *Attorney, Agent, or Firm* — VENABLE LLP

(57) ABSTRACT

A toner comprising a toner particle comprising a binder resin and a wax, wherein the binder resin comprises an amorphous polyester resin and a polymer A, contents of the amorphous polyester resin and the polymer A in the binder resin are within specific ranges, the polymer A comprises a first monomer unit in which ester (meth)acrylates comprising 18 to 36 carbon atoms are polymerized, a content ratio of the first monomer unit in the polymer A is within specific range, the toner comprises a matrix-domain structure comprising a matrix comprising the amorphous polyester resin and domains, and the domains comprise a domain A comprising at least 80 mass % of the polymer A and a domain B comprising at least 80 mass % of the wax.

14 Claims, No Drawings

(56) References Cited

U.S. PATENT DOCUMENTS

| | | | |
|---|---|---|---|
| 10,514,624 B2 | 12/2019 | Tamura et al. | |
| 10,564,560 B2 | 2/2020 | Onozaki et al. | |
| 10,599,060 B2 | 3/2020 | Kanno et al. | |
| 10,642,178 B2 | 5/2020 | Yamashita et al. | |
| 10,656,545 B2 | 5/2020 | Kamae et al. | |
| 10,775,710 B1 | 9/2020 | Kamae et al. | |
| 10,859,931 B2 | 12/2020 | Hashimoto et al. | |
| 10,859,935 B2 | 12/2020 | Ohtsu et al. | |
| 10,877,386 B2 | 12/2020 | Murayama et al. | |
| 10,969,705 B2 | 4/2021 | Shirayama et al. | |
| 2010/0143837 A1* | 6/2010 | Klier .................... | G03G 9/0833 430/114 |
| 2013/0108955 A1 | 5/2013 | Shibata et al. | |
| 2013/0244159 A1 | 9/2013 | Ishigami et al. | |
| 2013/0288173 A1 | 10/2013 | Hashimoto et al. | |
| 2014/0134535 A1 | 5/2014 | Baba et al. | |
| 2014/0137428 A1 | 5/2014 | Takenaka | |
| 2014/0329176 A1 | 11/2014 | Kanno et al. | |
| 2014/0363763 A1* | 12/2014 | Shibata ............. | G03G 9/08724 430/109.3 |
| 2015/0177635 A1 | 6/2015 | Fukudome | |
| 2018/0275540 A1 | 9/2018 | Matsuo et al. | |
| 2018/0364602 A1* | 12/2018 | Kadonome ........ | G03G 9/08711 |
| 2020/0073263 A1 | 3/2020 | Hama et al. | |
| 2020/0272068 A1 | 8/2020 | Ochi et al. | |
| 2020/0301301 A1 | 9/2020 | Chimoto et al. | |
| 2021/0063903 A1 | 3/2021 | Shibata et al. | |
| 2021/0141315 A1 | 5/2021 | Kamae et al. | |

FOREIGN PATENT DOCUMENTS

| | | | |
|---|---|---|---|
| JP | 2017-37292 A | | 2/2017 |
| JP | 2018156074 A | * | 10/2018 |
| JP | 2019-211763 A | | 12/2019 |
| JP | 2019-215526 A | | 12/2019 |
| JP | 2019-219643 A | | 12/2019 |

* cited by examiner

TONER AND METHOD FOR PRODUCING TONER

BACKGROUND OF THE INVENTION

Field of the Invention

The present disclosure relates to a toner usable in an electrophotography system, an electrostatic recording system, an electrostatic printing system, and the like, and to a method for producing the toner.

Description of the Related Art

As more and more full-color electrophotographic copiers are used recent years, demands have increased for lower energy consumption and higher productivity.

In order to address such issues of low energy consumption and higher productivity, there are demands for lower power consumption in a fixing step and greater numbers of prints per unit time from toners that exhibit excellent low-temperature fixability enabling rapid fixing at a lower temperature.

In order to achieve low-temperature fixability, lowering of the glass transition point or softening point of a binder resin in a toner and using a binder resin which exhibits sharp melt properties have been studied generally. However, because a molten toner tends to undergo wraparound without separating from a fixing member, there have been demands to achieve a balance between these characteristics.

In addition, demands for print on demand (POD) printing have increased, and there are requirements for printing on various types of paper, such as heavy paper or coated paper, in addition to plain paper. There have been demands for high image strength, regardless of the usage environment or storage environment of printed matter, such as rubfastness, scratch resistance, bending resistance and heat resistance of images printed on these types of paper. In particular, because coated paper comprises, at the surface thereof, a large amount of hard inorganic compounds such as calcium carbonate to impart the paper with smoothness, higher levels of rubfastness and bending resistance are required therefor in comparison with plain paper.

Japanese Patent Application Publication No. 2013-97321 discloses a toner in which a resin obtained by blending and mixing a polyester resin and a behenyl acrylate polymer is used in a binder resin.

SUMMARY OF THE INVENTION

The toner obtained by blending and mixing a polyester resin and a behenyl acrylate polymer disclosed in Japanese Patent Application Publication No. 2013-97321 exhibits a certain degree of low-temperature fixability and image preservation properties, but is poor in terms of fixed image strength. In addition, as a result of study by the inventors of the present invention, it was found that a behenyl acrylate polymer and a wax are readily compatible and the releasing effect of the wax decreases, whereby printing paper tends to undergo wraparound more easily at the time of fixing.

In addition, there have been demands in recent years for high image strength so that breaking and cracking do not occur when an image part is subjected to stress as a result of bending of a fixed image printed on heavy paper or coated paper.

The present disclosure provides a toner which achieves both excellent low-temperature fixability and resistance to wraparound at the time of fixing and which has high image strength even for an image fixed on heavy paper or coated paper; and a method for producing the toner.

One aspect of the present disclosure is a toner comprising a toner particle comprising a binder resin and a wax, wherein the binder resin comprises an amorphous polyester resin and a polymer A, a content of the amorphous polyester resin in the binder resin is at least 50.00 mass %, the polymer A comprises a first monomer unit comprising a structure represented by formula (1) below and a second monomer unit that is different from the first monomer unit.

a content ratio of the first monomer unit in the polymer A is 5.0 mol % to 60.0 mol % relative to a total number of moles of all monomer units in the polymer A, a content of the polymer A in the binder resin is 0.10 mass % to 10.00 mass %, a matrix-domain structure comprising a matrix comprising the amorphous polyester resin and domains is present in an observation of a cross section of the toner, and the domains comprise a domain A comprising at least 80 mass % of the polymer A and a domain B comprising at least 80 mass % of the wax.

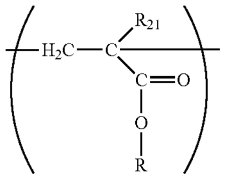

(1)

Where, $R_{Z1}$ denotes a hydrogen atom or a methyl group, and R denotes an alkyl group comprising 18 to 36 carbon atoms.

Another aspect of the present disclosure is a method for producing a toner, the method comprising:

a step for melt kneading raw materials comprising a binder resin and a wax; and a step for pulverizing an obtained melt-kneaded product, wherein the toner is a toner comprising a toner particle comprising the binder resin and the wax, the binder resin comprises an amorphous polyester resin and a polymer A, a content of the amorphous polyester resin in the binder resin is at least 50.00 mass %, the polymer A comprises a first monomer unit comprising a structure represented by formula (1) above and a second monomer unit that is different from the first monomer unit, a content ratio of the first monomer unit in the polymer A is 5.0 mol % to 60.0 mol % relative to a total number of moles of all monomer units in the polymer A, a content of the polymer A in the binder resin is 0.10 mass % to 10.00 mass %, a matrix-domain structure comprising a matrix comprising the amorphous polyester resin and domains is present in an observation of a cross section of the toner, and the domains comprise a domain A comprising at least 80 mass % of the polymer A and a domain B comprising at least 80 mass % of the wax.

Further, another aspect of the present disclosure is a method for producing a toner, the method comprising:

a step for preparing fine particle-dispersed solutions of each raw materials of the toner, a step for mixing the fine particle-dispersed solutions of each raw materials and adding a flocculant to form aggregate particles; and a step for heating and fusing the aggregate particles, wherein the toner is a toner comprising a toner particle comprising the binder resin and the wax, the binder resin comprises an amorphous polyester resin and a polymer A, a content of the amorphous polyester resin in the binder resin is at least 50.00 mass %, the polymer A comprises a first monomer unit comprising a structure represented by formula (1) above and a second monomer unit that is different from the first monomer units, a content ratio of the first monomer unit in the polymer A is 5.0 mol % to 60.0 mol % relative to a total number of moles of all monomer units in the polymer A, a content of the polymer A in the binder resin is 0.10 mass % to 10.00 mass %, a matrix-domain structure comprising a matrix comprising the amorphous polyester resin and domains is present in an observation of a cross section of the toner, and the domains comprise a domain A comprising at least 80 mass % of the polymer A and a domain B comprising at least 80 mass % of the wax.

According to the present disclosure, a toner which achieves both excellent low-temperature fixability and resistance to wraparound at the time of fixing and which has high image strength even for an image fixed on heavy paper or coated paper can be provided.

Further features of the present invention will become apparent from the following description of exemplary embodiments.

DESCRIPTION OF THE EMBODIMENTS

The terms "XX to YY" and "XX-YY", which indicate numerical ranges, mean numerical ranges that include the lower limits and upper limits that are the end points of the ranges.

In cases where numerical ranges are indicated incrementally, upper limits and lower limits of the numerical ranges can be arbitrarily combined.

The term "(meth)acrylic acid ester" means an acrylic acid ester and/or a methacrylic acid ester.

The term "monomer unit" means a reacted form of a monomer substance in a polymer. For example, one unit is one carbon-carbon bond segment in a main chain of a polymer obtained by polymerizing a vinyl-based monomer. The vinyl-based monomer can be represented by formula (Z) below.

(Z)

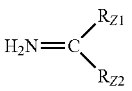

In formula (Z), $R_{Z1}$ denotes a hydrogen atom or an alkyl group (preferably an alkyl group with 1 to 3 carbon atoms, and more preferably a methyl group), and $R_{Z2}$ denotes an arbitrary substituent group.

Crystalline resin means a resin that gives a clear endothermic peak in differential scanning calorimetry (DSC) measurements.

The toner is a toner comprising a toner particle comprising a binder resin and a wax, wherein the binder resin comprises an amorphous polyester resin and a polymer A, a content of the amorphous polyester resin in the binder resin is at least 50.00 mass %, the polymer A comprises a first monomer unit comprising a structure represented by formula (1) below and a second monomer unit that is different from the first monomer unit:

(1)

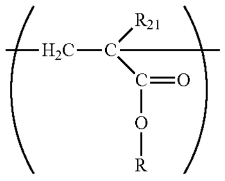

where, $R_{Z1}$ denotes a hydrogen atom or a methyl group, and R denotes an alkyl group comprising 18 to 36 carbon atoms, a content ratio of the first monomer unit in the polymer A is 5.0 mol % to 60.0 mol % relative to a total number of moles of all monomer units in the polymer A, a content of the polymer A in the binder resin is 0.10 mass % to 10.00 mass %, a matrix-domain structure comprising a matrix comprising the amorphous polyester resin and domains is present in an observation of a cross section of the toner, and the domains comprise a domain A comprising at least 80 mass % of the polymer A and a domain B comprising at least 80 mass % of the wax.

The inventors of the present invention found that by controlling the manner in which a crystalline vinyl resin is present with respect to an amorphous polyester resin in a toner particle, excellent low-temperature fixability is achieved and fixed image strength is improved. Specifically, it was understood that fixed image strength is improved if a crystalline vinyl resin is present as domains in a matrix.

The inventors of the present invention thought that the reason for this is possibly that the crystalline vinyl resin is present as domains even after fixing, and when an external stress is applied, such as bending of an image, this stress is absorbed. The crystalline vinyl resin has the structural characteristic that a long chain alkyl group present in a side chain, not in the main chain, exhibits crystallinity, and it is thought that this structural characteristic has the effect of absorbing stress.

Meanwhile, the long chain alkyl group segment in a side chain in the crystalline vinyl resin is similar in terms of chemical structure to the wax, and therefore the crystalline vinyl resin has the characteristic of being readily compatible with the wax. Therefore, in a system where the crystalline vinyl resin and the wax are both present, it is extremely difficult for these components to be present as independent domains.

As a result of diligent research, the inventors of the present invention succeeded in causing the crystalline vinyl resin and the wax to be present as independent domains due to the composition of the crystalline vinyl resin, and thereby completed the toner.

The toner is characterized by comprising a binder resin and a wax.

The content of the amorphous polyester resin in the binder resin is at least 50.00 mass %. This content is preferably at least 75.00 mass %, and more preferably at least 90.00 mass %. Meanwhile, the upper limit for this content is not particularly limited, but is preferably not more than 99.90 mass %, and more preferably not more than 97.00 mass %.

Polyhydric alcohols (at least dihydric and trihydric alcohols), polycarboxylic acids (divalent or trivalent or higher carboxylic acids), and acid anhydrides and lower alkyl esters thereof can be used as monomers able to be used in the amorphous polyester resin.

Examples of polyhydric alcohols able to be used include the following.

A bisphenol derivative is preferred as a dihydric alcohol component.

Examples of bisphenol derivatives include polyoxypropylene (2.2)-2,2-bis(4-hydroxyphenyl)propane, polyoxypropylene (3.3)-2,2-bis(4-hydroxyphenyl)propane, polyoxyethylene (2.0)-2,2-bis(4-hydroxyphenyl)propane, polyoxypropylene (2.0)-polyoxyethylene (2.0)-2,2-bis(4-hydroxyphenyl)propane and polyoxypropylene (6)-2,2-bis (4-hydroxyphenyl)propane.

Examples of other alcohol components include ethylene glycol, diethylene glycol, triethylene glycol, 1,2-propylene glycol, 1,3-propylene glycol, 1,4-butane diol, neopentyl glycol, 1,4-butene diol, 1,5-pentane diol, 1,6-hexane diol, 1,4-cyclohexanedimethanol, dipropylene glycol, polyethylene glycol, polypropylene glycol, polytetramethylene glycol, sorbitol, 1,2,3,6-hexane tetraol, 1,4-sorbitan, pentaerythritol, dipentaerythritol, tripentaerythritol, 1,2,4-butane triol, 1,2,5-pentane triol, glycerin, 2-methylpropane triol, 2-methyl-1,2,4-butane triol, trimethylolethane, trimethylolpropane and 1,3,5-trihydroxymethylbenzene.

Examples of at last trihydric alcohols include sorbitol, 1,2,3,6-hexane tetraol, 1,4-sorbitan, pentaerythritol, dipentaerythritol, tripentaerythritol, 1,2,4-butane triol, 1,2,5-pentane triol, glycerol, 2-methylpropane triol, 2-methyl-1,2,4-butane triol, trimethylolethane, trimethylolpropane and 1,3,5-trihydroxymethylbenzene.

Of these, glycerol, trimethylolpropane and pentaerythritol are preferred. It is possible to use one of these at least dihydric or trihydric alcohols in isolation, or a plurality thereof.

Examples of polycarboxylic acids able to be used include the following.

Examples of divalent carboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, and anhydrides and lower alkyl esters of these acids.

Of these, maleic acid, fumaric acid, terephthalic acid and n-dodecenylsuccinic acid are preferred.

Examples of at least trivalent carboxylic acids, anhydrides thereof and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, empol trimer acid, and acid anhydrides and lower alkyl esters of these acids.

Of these, 1,2,4-benzenetricarboxylic acid, that is, trimellitic acid, and derivatives thereof are preferred due to being inexpensive and facilitating reaction control. It is possible to use one of these at least divalent or trivalent carboxylic acids in isolation, or a plurality thereof.

The method for producing the polyester is not particularly limited, and a publicly known method can be used. For example, the polyester resin can be produced by simultaneously charging the alcohol monomer and the carboxylic acid monomer and then polymerizing by means of an esteritication reaction or transcsterification reaction and a condensation reaction. In addition, the polymerization temperature is not particularly limited, but preferably falls within the range of 180° C. to 290° C. When polymerizing the polyester, it is possible to use a polymerization catalyst such as a titanium-based catalyst, a tin-based catalyst, zinc acetate, antimony trioxide or germanium dioxide. It is more preferable to carry out the polymerization using a titanium-based catalyst and/or a tin-based catalyst.

From the perspective of charge maintaining properties in a high temperature high humidity environment, the acid value of the amorphous polyester resin is preferably 5 mg KOH/g to 30 mg KOH/g. Furthermore, it is preferable for the hydroxyl value of the amorphous polyester resin to be 20 mg KOH/g to 70 mg KOH/g from the perspectives of low-temperature fixability and storability.

The amorphous polyester resin may be a mixture of an amorphous polyester resin L having a low softening point and an amorphous polyester resin H having a high softening point. The content ratio (L/H) of the amorphous polyester resin L and the amorphous polyester resin H is preferably 50/50 to 90/10 on a mass basis.

The softening point of the amorphous polyester resin L is preferably 65° C. to 110° C., and the softening point of the amorphous polyester resin H is preferably 115° C. to 160° C.

The toner particle comprises a wax.

Examples of the wax include the types listed below.

Hydrocarbon waxes such as low molecular weight polyethylene, low molecular weight polypropylene, alkylene copolymers, microcrystalline waxes, paraffin waxes and Fischer Tropsch waxes; oxides of hydrocarbon waxes, such as oxidized polyethylene waxes, and block copolymers thereof; waxes comprising mainly fatty acid esters, such as carnauba wax; and waxes obtained by partially or wholly deoxidizing fatty acid esters, such as deoxidized carnauba wax. Saturated straight chain fatty acids such as palmitic acid, stearic acid and montanic acid; unsaturated fatty acids such as brassidic acid, eleostearic acid and parinaric acid; saturated alcohols such as stearyl alcohol, aralkyl alcohols, behenyl alcohol, carnaubyl alcohol, ceryl alcohol and melissyl alcohol; polyhydric alcohols such as sorbitol; esters of fatty acids such as palmitic acid, stearic acid, behenic acid and montanic acid and alcohols such as stearyl alcohol, aralkyl alcohols, behenyl alcohol, carnaubyl alcohol, ceryl alcohol and melissyl alcohol; fatty acid amides such as linoleic acid amide, oleic acid amide and lauric acid amide; saturated fatty acid bisamides such as methylene bis-stearic acid amide, ethylene bis-capric acid amide, ethylene bis-lauric acid amide and hexamethylene bis-stearic acid amide; unsaturated fatty acid amides such as ethylene bis-oleic acid amide, hexamethylene bis-oleic acid amide, N,N'-dioleyladipic acid amide and N,N'-dioleylsebacic acid amide; aromatic bisamides such as m-xylene bis-stearic acid amide and N,N'-distearylisophthalic acid; fatty acid metal salts (commonly known as metal soaps) such as calcium stearate, calcium laurate, zinc stearate and magnesium stearate; waxes obtained by grafting vinyl monomers such as styrene and acrylic acid onto aliphatic hydrocarbon-based waxes; partial esters of fatty acids and polyhydric alcohols, such as behenic acid monoglyceride; and hydroxyl group-comprising methyl ester compounds obtained by hydrogenating plant-based oils and fats.

Of these waxes, hydrocarbon waxes, such as paraffin waxes and Fischer Tropsch waxes, and fatty acid ester-based waxes, such as carnauba wax, are preferred. Hydrocarbon waxes are more preferred from the perspective of tending to be present in domains in toner particles having a high amorphous polyester resin content. That is, the wax preferably comprises a hydrocarbon wax, and more preferably is a hydrocarbon wax.

The wax content is preferably 2.00 to 10.00 parts by mass relative to 100.00 parts by mass of the binder resin.

The binder resin comprises a polymer A. In addition, the polymer A comprises a crystalline segment derived from a long chain alkyl group present in a first monomer unit.

The polymer A is a polymer of a composition comprising a first polymerizable monomer and a second polymerizable monomer that is different from the first polymerizable monomer. In addition, the polymer A comprises a first monomer unit and a second monomer unit that is different from the first monomer unit. The first (or second) monomer unit is, for example, a monomer unit formed by addition polymerization (vinyl polymerization) of the first (or second) polymerizable monomer.

The first polymerizable monomer is at least one monomer selected from the group consisting of (meth)acrylic acid esters comprising an alkyl group with 18 to 36 carbon atoms. In addition, the first monomer unit is derived from the first polymerizable monomer, and comprises a structure formed by addition polymerization of the first polymerizable monomer.

The (meth)acrylic acid ester comprises an alkyl group comprising 18 to 36 carbon atoms, and can therefore impart the binder resin with crystallinity. As a result, the toner exhibits sharp melt properties, and excellent low-temperature fixability can be achieved.

However, in the case of a (meth)acrylic acid ester comprising an alkyl group comprising fewer than 18 carbon atoms, the chain length of the alkyl group is short and the thus obtained polymer A does not exhibit crystallinity, meaning that image strength deteriorates. In addition, in the case of a (meth)acrylic acid ester comprising an alkyl group comprising more than 37 carbon atoms, the melting point of the thus obtained polymer A increases and low-temperature fixability deteriorates.

The first monomer unit is represented by formula (1) below.

The content of the first monomer unit in the polymer A is preferably 30.0 mass % to 90.0 mass %, more preferably 40.0 mass % to 80.0 mass %, and further preferably 45.0 mass % to 75.0 mass %.

(1)

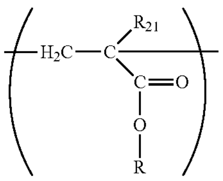

In formula (1), $R_{Z1}$ denotes a hydrogen atom or a methyl group, and R denotes an alkyl group comprising 18 to 36 carbon atoms (and preferably a straight chain alkyl group comprising 18 to 30 carbon atoms).

Examples of (meth)acrylic acid esters comprising an alkyl group with 18 to 36 carbon atoms include (meth)acrylic acid esters comprising a straight chain alkyl group with 18 to 36 carbon atoms [stearyl (meth)acrylate, nonadecyl (meth)acrylate, eicosyl (meth)acrylate, heneicosyl (meth)acrylate, behenyl (meth)acrylate, lignoceryl (meth)acrylate, ceryl (meth)acrylate, octacosyl (meth)acrylate, myricyl (meth)acrylate, dotriacontyl (meth)acrylate, and the like] and (meth)acrylic acid esters comprising a branched chain alkyl group with 18 to 36 carbon atoms [2-decyltetradecyl (meth)acrylate, and the like].

Of these, at least one type selected from the group consisting of (meth)acrylic acid esters comprising a straight chain alkyl group with 18 to 36 carbon atoms is preferred from the perspective of low-temperature fixability, and at least one type selected from the group consisting of (meth)acrylic acid esters comprising a straight chain alkyl group with 18 to 30 carbon atoms is more preferred.

Of these, at least one type selected from the group consisting of straight chain stearyl (meth)acrylate, straight chain arachidyl (meth)acrylate and behenyl (meth)acrylate is further preferred, at least one type selected from the group consisting of straight chain arachidyl(meth)acrylate and behenyl (meth)acrylate is further preferred, and at least one type selected from the group consisting of behenyl (meth)acrylate is particularly preferred.

The first polymerizable monomer may be a single monomer or a combination of at least two types.

The content of the first monomer unit in the polymer A is 5.0 mol % to 60.0 mol % relative to the total number of moles of all monomer units in the polymer A. In addition, the content of the first polymerizable monomer in the composition for producing the polymer A is 5.0 mol % to 60.0 mol % relative to the total number of moles of all polymerizable monomers in the composition.

At the content mentioned above, the toner exhibits sharp melt properties as a result of crystallinity, excellent low-temperature fixability can be achieved, the wax and the polymer A form independent domains, and resistance to wraparound is improved.

This content is preferably 10.0 mol % to 60.0 mol %, and more preferably 20.0 mol % to 40.0 mol %.

However, in cases where this content is less than 5.0 mol %, the proportion of crystalline portions is low, meaning that low-temperature fixability decreases. In addition, in cases where this content exceeds 60.0 mol %, the polymer A and the wax are readily compatible, and independent domains cannot be formed. Therefore, release properties at the time of fixing cannot be achieved, resistance to wraparound deteriorates, and image strength also deteriorates.

Moreover, in cases where the polymer A comprises at least two first monomer units derived from (meth)acrylic acid esters comprising an alkyl groups comprising 18 to 36 carbon atoms, the content of the first monomer unit indicates the total molar ratio of these. In addition, in cases where the composition used for the polymer A comprises at least two types of (meth)acrylic acid ester each comprising an alkyl group with 18 to 36 carbon atoms, the content of the first polymerizable monomer is the total molar proportion of these monomers.

The content of the polymer A is 0.10 mass % to 10.00 mass % relative to the total mass of the binder resin. In cases where the content of the polymer A is 0.10 mass % to 10.00 mass %, it is possible to achieve both excellent low-temperature fixability and resistance to wraparound. This content is preferably 1.00 mass % to 9.00 mass %, and more preferably 3.00 mass % to 7.00 mass %.

In cases where the content of the polymer A is less than 0.10 mass %, it is not possible to achieve sharp melt properties, and low-temperature fixability deteriorates. In addition, in cases where the content of the polymer A is greater than 10.00 mass %, the releasing effect of the wax tends to be impaired when the toner particle melts, meaning that resistance to wraparound deteriorates.

From the perspective of charge stability in a normal temperature low humidity environment, if the content of the polymer A in the toner particle is denoted by Wa (mass %) and the content of the wax in the in the toner particle is denoted by Ww (mass %), the value of Wa+Ww is preferably 3.00 to 20.00. This value is more preferably 3.00 to 15.00.

In addition, if the content of the polymer A in the toner particle is denoted by Wa (mass %) and the content of the wax in the in the toner particle is denoted by Ww (mass %), the value of Wa-Ww is preferably not more than 5.00. This value is more preferably not more than 2.00.

The lower limit for this value is not particularly limited, but is preferably at least 0.00. Within the range mentioned above, the wax is unlikely to be taken in to the polymer A, and release properties are readily achieved.

For similar reasons, the value of Wa/Ww is preferably 0.02 to 5.00. This value is more preferably 0.05 to 2.00, and further preferably 0.10 to 1.20.

The second monomer unit is preferably at least one type selected from the group consisting of a monomer unit represented by formula (2) below and a monomer unit represented by formula (3) below.

The content of the second monomer unit in the polymer A is preferably 1.0 mass % to 70.0 mass %, more preferably 10.0 mass % to 60.0 mass %, and further preferably 15.0 mass % to 50.0 mass %.

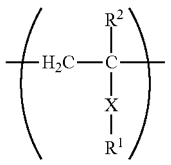

(2)

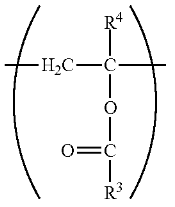

(3)

In formula (2), X denotes a single bond or an alkylene group comprising 1 to 6 carbon atoms.

$R^1$ is —C≡N,

—C(=O)NHR$^{10}$ ($R^{10}$ denotes a hydrogen atom or an alkyl group comprising 1 to 4 carbon atoms), a hydroxyl group, —COOR$^{11}$ ($R^{11}$ is a hydrogen atom, an alkyl group comprising 1 to 6 carbon atoms (and preferably 1 to 4 carbon atoms) or a hydroxyalkyl group comprising 1 to 6 carbon atoms (and preferably 1 to 4 carbon atoms)), —NH—C(=O)—N(R$^{13}$)$_2$ (the two $R^{13}$ groups each independently denote a hydrogen atom or an alkyl group comprising 1 to 6 carbon atoms (and preferably 1 to 4 carbon atoms)), —COO(CH$_2$)$_2$—NHCOOR$^{14}$ ($R^{14}$ denotes an alkyl group comprising 1 to 4 carbon atoms) or —COO(CH$_2$)$_2$—NH—C(=O)—N(R')$_2$ (the two $R^{15}$ groups each independently denote a hydrogen atom or an alkyl group comprising 1 to 6 carbon atoms (and preferably 1 to 4 carbon atoms)).

$R^2$ denotes a hydrogen atom or a methyl group.

In formula (3), $R^3$ denotes an alkyl group comprising 1 to 4 carbon atoms, and $R^4$ denotes a hydrogen atom or a methyl group.

If the SP value (J/cm$^3$)$^{0.5}$ of the second monomer unit is denoted by $SP_{21}$, the value of $SP_{21}$ is preferably at least 21.00 from the perspective of fixing performance. The value of $SP_{21}$ is more preferably at least 23.00, and further preferably at least 25.00. The upper limit for the value of $SP_{21}$ is not particularly limited, but is preferably not more than 40.00, and more preferably not more than 30.00.

Here, SP value is an abbreviation of "solubility parameter", and serves as an indicator of solubility. The calculation method is described later.

Moreover, units for SP values are (J/m$^3$)$^{0.5}$, but these can be converted into units of (cal/cm$^3$)$^{0.5}$ because 1 (cal/cm$^3$)$^{0.5}$=2.045*10$^3$ (J/m$^3$)$^{0.5}$.

The polarity of a monomer unit or polymerizable monomer increases as the SP value increases, and the polarity of a monomer unit or polymerizable monomer decreases as the SP value decreases. It is known that as the difference in SP value between different monomer units or polymerizable monomers decreases, the polarity values of the different monomer units or polymerizable monomers become closer and compatibility tends to increase.

Because a second monomer unit comprising the SP value mentioned above exhibits higher polarity than the first monomer unit, monomer units having different polarities are present in the polymer A if the second monomer unit is contained. Because SP values of ordinary waxes are lower than that of the first monomer unit, compatibility between the wax and the polymer A decreases and resistance to wraparound is improved.

The content of the second monomer unit in the polymer A is preferably 20.0 mol % to 95.0 mol % relative to the total number of moles of all monomer units in the polymer A. In addition, the content of the second polymerizable monomer in the composition for producing the polymer A is preferably 20.0 mol % to 95.0 mol % relative to the total number of moles of all polymerizable monomers in the composition.

In cases where this content is at least 20.0 mol %, a sufficient amount of highly polar regions are present in the polymer A, meaning that resistance to wraparound is further improved. In addition, in cases where this content is not more than 95.0 mol %, a balance between low-temperature fixability and resistance to wraparound is readily achieved.

In addition, from the perspectives of charge maintaining properties and rubfastness, the content of the second monomer unit in the polymer A is more preferably 40.0 mol % to 90.0 mol %, and further preferably 40.0 mol % to 70.0 mol %, relative to the total number of moles of all monomer units in the polymer A. For similar reasons, the content of the second polymerizable monomer in the composition for producing the polymer A is more preferably 40.0 mol % to 90.0 mol %, and further preferably 40.0 mol % to 70.0 mol %, relative to the total number of moles of all polymerizable monomers in the composition.

In cases where at least two types of second monomer unit that satisfy the SP value mentioned above are present in the polymer A, the proportion of the second monomer is expressed as the total molar ratio of these. In addition, in cases where the composition used for the polymer A comprises at least two types of second polymerizable monomer, the content of the second polymerizable monomer is the total molar proportion of these monomers.

Specifically, the polymerizable monomers listed below can be given as examples of the second polymerizable monomer.

Nitrile group-comprising monomers; for example, acrylonitrile and methacrylonitrile.

Hydroxyl group-comprising monomers: for example, 2-hydroxyethyl (meth)acrylate and 2-hydroxypropyl (meth) acrylate.

Amido group-comprising monomers; for example, acrylamide, and monomers obtained by reacting an amine comprising 1 to 30 carbon atoms with a carboxylic acid comprising 2 to 30 carbon atoms and comprising an ethylenically unsaturated bond (acrylic acid, methacrylic acid, and the like) using a publicly known method.

Urea group-comprising monomers: for example, monomers obtained by reacting an amine comprising 3 to 22 carbon atoms (a primary amine (n-butylamine, t-butylamine, propylamine, isopropylamine, or the like), a secondary amine (di-n-ethylamine, di-n-propylamine, di-n-butylamine, or the like), aniline, cyclohexylamine, or the like] and an isocyanate comprising 2 to 30 carbon atoms and comprising an ethylenically unsaturated bond using a publicly known method.

Carboxyl group-comprising monomers: for example, methacrylic acid, acrylic acid and 2-carboxyethyl (meth) acrylate.

Of these, use of a monomer comprising a nitrile group, an amido group, a hydroxyl group or a urea group is preferred. More preferably, the second polymerizable monomer is a monomer comprising an ethylenically unsaturated bond and at least one type of functional group selected from the group consisting of a nitrile group, an amido group, a hydroxyl group and a urea group.

A case where these monomers are used is preferable from the perspective of improving the speed of charge rising of the toner. If the speed of charge rising of the toner is rapid, there is almost no difference in terms of toner charge quantity in a developing machine between a case where an image is printed at a high print coverage rate and a case where an image is printed at a low print coverage rate, which is desirable from the perspective of being able to suppress density variations caused by differences in charge quantity between an initial print and after many prints have been printed.

In addition, vinyl esters such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate and vinyl octanoate can be advantageously used as the second polymerizable monomer. Of these, vinyl esters are non-conjugated monomers and tend to maintain an appropriate degree of reactivity with the first polymerizable monomer and tend to increase the crystallinity of a polymer, and are therefore preferred from the perspective of low-temperature fixability.

The second polymerizable monomer preferably comprises an ethylenically unsaturated bond, and more preferably comprises one ethylenically unsaturated bond.

The second polymerizable monomer is more preferably at least one type selected from the group consisting of formulae (A) and (B) below.

(A)

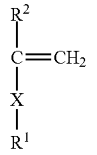

(B)

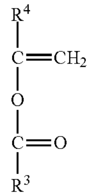

In formula (A), X denotes a single bond or an alkylene group comprising 1 to 6 carbon atoms.

$R^1$ is —C≡N,

—C(=O)NHR$^{10}$ (R$^{10}$ denotes a hydrogen atom or an alkyl group comprising 1 to 4 carbon atoms), a hydroxyl group.

—COOR$^{11}$ (R$^{11}$ is a hydrogen atom, an alkyl group comprising 1 to 6 carbon atoms (and preferably 1 to 4 carbon atoms) or a hydroxyalkyl group comprising 1 to 6 carbon atoms (and preferably 1 to 4 carbon atoms)), —NH—C(=O)—N(R$^{13}$)$_2$ (the two R$^{13}$ groups each independently denote a hydrogen atom or an alkyl group comprising 1 to 6 carbon atoms (and preferably 1 to 4 carbon atoms)), —COO(CH$_2$)$_2$NHCOOR$^{14}$ (R$^{14}$ denotes an alkyl group comprising 1 to 4 carbon atoms) or —COO(CH$_2$)$_2$—NH—C(=O)—N(R$^{15}$)$_2$ (the two R$^{15}$ groups are each independently a hydrogen atom or an alkyl group with 1 to 6 (and preferably 1 to 4) carbon atoms).

$R^2$ denotes a hydrogen atom or a methyl group.

In formula (B), $R^3$ denotes an alkyl group comprising 1 to 4 carbon atoms, and $R^4$ denotes a hydrogen atom or a methyl group.

The polymer A comprises at least one monomer unit selected from the group consisting of monomer units represented by formulae (2) and (3) above, and is therefore preferred from the perspectives of achieving excellent low-temperature fixability, excellent resistance to wraparound, and high image strength.

In this case, the second monomer unit becomes highly polar and there is a difference in terms of polarity between the first and second monomer units. It is thought that this difference in polarity facilitates crystallization of the first monomer unit and allows excellent low-temperature fixability to be achieved. It is thought that the mechanism by which crystallization of the first monomer units is facilitated is as follows.

The first monomer unit is included in the polymer A, and crystallinity is exhibited by first monomer units aggregating with each other. In an ordinary case, a polymer is unlikely to exhibit crystallinity because crystallization of the first monomer unit is impaired if other monomer units are included. This tendency becomes more prominent if a plurality of types of monomer unit randomly bond to each other in a single polymer molecule.

However, by using a second polymerizable monomer having a different polarity from the first polymerizable monomer, it is thought that the first polymerizable monomer and the second polymerizable monomer are not randomly bonded at the time of polymerization and can bond in a somewhat continuous manner. It is thought that as a result of this, blocks are formed in which first monomer units have aggregated with each other, the polymer A is a block copolymer, crystallinity can be increased even if other monomer units are included, and excellent low-temperature fixability can be achieved.

Furthermore, by using a second polymerizable monomer having a different polarity from the first polymerizable monomer, the wax tends to be incompatible with the polymer A and tends to be present as independent domains in the toner particle, meaning that resistance to wraparound is improved.

The polymer A may contain a third monomer unit, which is formed through addition polymerization (vinyl polymerization) of a third polymerizable monomer that is different from the first monomer unit and second monomer unit mentioned above.

Among monomers listed above as the second polymerizable monomer, monomers that do not satisfy the SP value stipulation above can be advantageously used as the third polymerizable monomer.

In addition, the monomers listed below can also be used.

For example, styrene and derivatives thereof, such as styrene and o-methylstyrene; and (meth)acrylic acid esters, such as methyl(meth)acrylate, n-butyl (meth)acrylate, t-butyl (meth)acrylate and 2-ethylhexyl (meth)acrylate.

Of these, the third polymerizable monomer is preferably styrene. In cases where the third polymerizable monomer is styrene, compatibility between the amorphous polyester resin and the polymer A is reduced by steric hindrance of the aromatic ring of the styrene. Therefore, styrene is preferred from the perspectives of the polymer A tending to be present as independent domains and image strength being improved.

The content of the third monomer unit in the polymer A is preferably 1.0 mass % to 30.0 mass %, and more preferably 5.0 mass % to 20.0 mass %. In addition, the content of the third monomer unit in the polymer A is preferably 1.0 mol % to 30.0 mol %, and more preferably 5.0 mol % to 20.0 mol %.

The acid value of the polymer A is preferably not more than 30.0 mg KOH/g, and more preferably not more than 20.0 mg KOH/g.

In cases where the acid value falls within the range mentioned above, hygroscopicity decreases in high temperature high humidity environments and excellent charge maintaining properties can therefore be achieved. The lower limit of this acid value is not particularly limited, but is preferably at least 0 mg KOH/g.

The weight average molecular weight (Mw) of tetrahydrofuran (THF)-soluble matter in the polymer A, as measured by gel permeation chromatography (GPC), is preferably 10,000 to 200,000, more preferably 20,000 to 150,000, and further preferably 20,000 to 60,000. If this Mw value falls within the range mentioned above, elasticity is likely to be maintained at temperatures close to room temperature.

In addition, the melting point of the polymer A is preferably 50° C. to 80° C., and more preferably 53° C. to 70° C. If the melting point of the polymer A falls within the range mentioned above, superior low-temperature fixability is achieved.

The melting point of the polymer A can be controlled by adjusting the type and amount of the first polymerizable monomer being used, the type and amount of the second polymerizable monomer, and the like.

The polymer A is preferably a vinyl polymer. Examples of vinyl polymers include polymers of monomers that contain ethylenically unsaturated bonds. An ethylenically unsaturated bond is a carbon-carbon double bond capable of radical polymerization, and examples thereof include vinyl groups, propenyl groups, acryloyl groups and methacryloyl groups.

If necessary, the binder resin can contain resins other than the amorphous polyester resin and the polymer A. The resins listed below can be given as examples of resins able to be used in the binder resin in addition to the amorphous polyester resin and the polymer A.

Homopolymers of styrene and substituted styrene compounds, such as polystyrene, poly-p-chlorostyrene and poly (vinyl toluene): styrene-based copolymers such as styrene-p-chlorostyrene copolymers, styrene-vinyl toluene copolymers, styrene-vinyl naphthalene copolymers, styrene-acrylic acid ester copolymers, styrene-methacrylic acid ester copolymers, styrene-a-chloromethyl methacrylate copolymers, styrene-a-chloromethyl methacrylate copolymers, styrene-vinyl methyl ether copolymers, styrene-vinyl ethyl ether copolymers, styrene-vinyl methyl ketone copolymers and styrene-acrylonitrile-indene copolymers; poly(vinyl chloride), phenolic resins, natural resin-modified phenolic resins, natural resin-modified maleic acid resins, acrylic resins, methacrylic resins, poly(vinyl acetate) resins, silicone resins, polyester resins, polyurethane resins, polyamide resins, furan resins, epoxy resins, xylene resins, poly(vinyl butyral), terpene resins, cumarone-indene resins and petroleum-based resins.

Of these, a vinyl resin such as a styrene-based copolymer is preferred.

The toner particle comprises a matrix-domain structure comprising a matrix comprising the amorphous polyester resin and domains. The domains comprise a domain A comprising at least 80 mass % of the polymer A and a domain B comprising at least 80 mass % of the wax.

By comprising the domain A and the domain B, the domains exhibit resistance to wraparound at the time of fixing and can ensure bending resistance of a fixed image.

A method for confirming that a toner particle comprises a matrix-domain structure and a method for differentiating between the domain A and the domain and B are explained later.

The content of the polymer A in the domain A is preferably at least 85 mass %, and more preferably at least 89 mass %. The upper limit for this content is not particularly limited, but is preferably not more than 98 mass %, and more preferably not more than 95 mass %.

The content of the wax in the domain B is preferably at least 83 mass %, and more preferably at least 86 mass %. The upper limit for this content is not particularly limited, but is preferably not more than 98 mass %, and more preferably not more than 95 mass %.

As mentioned above, the wax and the first monomer unit that constitutes the polymer A have similar chemical structures. Therefore, the wax tends to be compatible with a polymer comprising only the first monomer unit. Therefore, in cases where a toner is produced using a conventional method, the wax and a polymer comprising only the first monomer unit are present as a compatibilized domain in a toner particle.

However, by controlling the proportion of the first monomer unit in the polymer A to a specific range, compatibility with the wax is decreased without causing a decrease in low-temperature fixability, and the polymer A tends to be present as independent domains in a toner particle.

In addition, by incorporating a second monomer unit which has a specific SP value and comprises a specific functional group, the polymer A is more likely to be present as independent domains.

In addition, there are means for making the polymer A and the wax more likely to be present as independent domains at the time of toner production. In a case where the toner is produced using a melt kneading method, it is possible to use a method comprising kneading while preventing compatibilization at a low temperature at which materials can be melted, and then rapidly cooling, or a method comprising mixing the polymer A with a master batch, which is obtained by melt kneading the amorphous polyester resin and the wax in advance, and then melt kneading again.

In a case where the toner is produced using an emulsion aggregation method, there are means for reducing the chance of contact between fine particles of the wax and fine particles of the polymer A. For example, a method comprising coagulating a mixed solution of a wax fine particle-dispersed solution and a binder resin fine particle-dispersed solution, and then adding a polymer A fine particle-dispersed solution so as to produce aggregated particles.

Another method comprises co-emulsifying wax fine particles and binder resin fine particles so as to produce a fine particle-dispersed solution in which wax fine particles are contained in a binder resin, and then mixing with a polymer A fine particle-dispersed solution so as to form aggregated particles.

Moreover, domains in which the content of domains other than the domain A and the domain B, that is the content ratio of the polymer A and the wax is a mass ratio of 21/79 to 79/21 can be regarded as domains in which both components are compatibilized, and are thought to be domains that do not contribute to an improvement in resistance to wrap-around or an improvement in image strength.

From the perspectives of ensuring resistance to wrap-around and image strength, the areal ratio of the domain A and the domain B relative to the area of the domains is preferably at least 20%, at least 50%, at least 70%, at least 80%, or at least 90%. This areal ratio is more preferably at least 92%. The upper limit for this areal ratio is not particularly limited, but is preferably not more than 100%, and more preferably not more than 99%. These numerical ranges can be arbitrarily combined.

In an observed cross section of the toner, the ratio of the area of the domains relative to the cross-sectional area of the toner is preferably 5% to 20%, and more preferably 7% to 15%.

In an observation of a cross section of the toner, the number-average value of the circle-equivalent diameter of the domains A is preferably 0.1 μm to 0.8 μm, and more preferably 0.1 μm to 0.4 μm.

In addition, the number-average value of the circle-equivalent diameter of the domains B is preferably 0.1 μm to 1.0 μm, and more preferably 0.1 μm to 0.5 μm.

The areal ratio and number-average value of circle-equivalent diameter of the domains can be measured in an observation of a cross section of the toner using a transmission electron microscope described later.

Colorant

The toner may contain a colorant if necessary. Examples of the colorant include those listed below.

Examples of black colorants include carbon black; and materials that are colored black through use of yellow colorants, magenta colorants and cyan colorants. The colorant may be only a pigment or a combination of a dye and a pigment. From the perspective of image quality of a full color image, it is preferable to use a combination of a dye and a pigment.

Examples of pigments for magenta toners include those listed below. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35.

Examples of dyes for magenta toners include those listed below. Oil-soluble dyes such as C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39 and 40; and C.I. Basic Violet 1, 3, 7, 10, 14, 15, 21, 25, 26, 27 and 28.

Examples of pigments for cyan toners include those listed below. C.I.

Pigment Blue 2, 3, 15:2, 15:3, 15:4, 16 and 17; C.I. Vat Blue 6; C.I. Acid Blue 45, and copper phthalocyanine pigments in which 1 to 5 phthalimidomethyl groups in the phthalocyanine skeleton are substituted.

An example of a dye for a cyan toner is C.I. Solvent Blue 70.

Examples of pigments for yellow toners include those listed below. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3 and 20.

An example of a dye for yellow toner is C.I. Solvent Yellow 162.

These colorants can be used singly or as a mixture, and can be used in the form of solid solutions. These colorants are selected in view of hue angle, chroma, lightness, light-fastness, OHP transparency and dispersibility in the toner.

The content of the colorant is preferably 0.1 parts by mass to 30.0 parts by mass relative to 100 parts by mass of the binder resin.

Charge Control Agent

The toner particle may contain a charge control agent if necessary. By blending a charge control agent, it is possible to stabilize charging characteristics and control the triboelectric charge quantity according to the developing system being used.

A publicly known charge control agent can be used, but an aromatic carboxylic acid metal compound is particularly preferred from the perspectives of being colorless, toner charging speed being rapid, and being able to stably maintain a certain degree of charge quantity.

Examples of negative type charge control agents include metal salicylate compounds, metal naphthoate compounds, metal dicarboxylate compounds, polymer type compounds comprising a sulfonic acid or carboxylic acid in a side chain, polymer type compounds comprising a sulfonic acid salt or sulfonic acid ester in a side chain, polymer type compounds comprising a carboxylic acid salt or carboxylic acid ester in a side chain, boron compounds, urea compounds, silicon compounds and calixarenes.

The charge control agent may be internally or externally added to the toner particles. The content of the charge control agent is preferably 0.2 parts by mass to 10.0 parts by mass, and more preferably 0.5 parts by mass to 10.0 parts by mass, relative to 100 parts by mass of the binder resin.

Inorganic Fine Particles

The toner may contain inorganic fine particles if necessary.

The inorganic fine particles may be internally added to the toner particle or mixed as an external additive with the toner. Examples of inorganic fine particles include silica fine particles, titanium oxide fine particles, alumina fine particles and composite oxide fine particles of these. Among these inorganic fine particles, silica fine particles and titanium oxide fine particles are preferred from the perspectives of improved fluidity and uniform charging.

These inorganic fine particles are preferably hydrophobized by means of a hydrophobizing agent such as a silane compound, a silicone oil or a mixture of these.

From the perspective of improving fluidity, the inorganic fine particles added as an external additive preferably have a specific surface area of 50 $m^2/g$ to 400 $m^2/g$. In addition, from the perspective of improving durable stability, the inorganic fine particles added as an external additive preferably have a specific surface area of 10 $m^2/g$ to 50 $m^2/g$. In order to achieve both improved flowability and durable stability, it is possible to use a combination of types of inorganic fine particle whose specific surface areas fall within the ranges mentioned above.

The content of the external additive is preferably 0.1 parts by mass to 10.0 parts by mass relative to 100 parts by mass of the toner particle. When mixing the toner particles with the external additive, a publicly known mixer such as a Henschel mixer may be used.

Developer

The toner can also be used as a single component developer, but from the perspectives of further improving dot reproducibility and providing stable images over a long period of time, the toner is preferably used as a two component developer that is mixed with a magnetic carrier.

The magnetic carrier can bean ordinary publicly known carrier, such as iron oxide; particles of a metal such as iron, lithium, calcium, magnesium, nickel, copper, zinc, cobalt, manganese, chromium or a rare earth element, or particles of alloys or oxides of these metals; a magnetic material such as ferrite; or a magnetic material-dispersed resin carrier (a so-called resin carrier) that comprises a magnetic material and a binder resin that holds the magnetic material in a dispersed state.

In cases where the toner is used as a two component developer that is mixed with a magnetic carrier, the blending proportion of the magnetic carrier in the two component developer is such that the concentration of the toner in the two component developer is preferably 2 mass % to 15 mass %, and more preferably 4 mass % to 13 mass %.

Toner Production Method

The method for producing the toner is not particularly limited, and a publicly known method such as a pulverization method, a dissolution suspension method, an emulsion aggregation method or a dispersion polymerization method can be used.

The toner is preferably produced using a pulverization method. In addition, the toner is preferably produced using an emulsion aggregation method.

An explanation will now be given of a procedure for producing a toner using a pulverization method as an example.

A method for producing a toner using a pulverization method preferably comprises:

a step for melt kneading raw materials comprising a binder resin and a wax; and a step for pulverizing the obtained melt-kneaded product.

First, prescribed quantities of a binder resin, a wax and, if necessary, other components such as a colorant and a charge control agent, are weighed out as raw materials that constitute the toner particle, and then blended and mixed.

Examples of the mixing device include a double cone mixer, a V type mixer, a drum type mixer, a supermixer, a Henschel mixer, a Nauta mixer and a Mechano Hybrid (produced by Nippon Coke and Engineering Co., Ltd.).

Next, the mixed materials are melt kneaded so as to disperse the wax and the like in the binder resin. In a melt kneading step, a batch type kneader, such as a pressurizing kneader or Banbury mixer, or a continuous type kneader can be used, and single screw and twin screw extruders are preferred from the perspective of enabling continuous production.

Examples thereof include KTK type twin screw extruders (produced by Kobe Steel Ltd.), TEM type twin screw extruders (produced by Toshiba Machine Co., Ltd.). PCM kneaders (produced by Ikegai Corp.), twin screw extruders (produced by KCK), co-kneaders (produced by Buss) and Kneadex (produced by Nippon Coke & Engineering Co., Ltd.). Furthermore, a resin composition obtained by melt kneading (a melt-kneaded product) is rolled using a 2-roll roller or the like, and may be cooled by means of water or the like in a cooling step. As mentioned above, it is preferable to optimize production conditions such as temperature, screw configuration and screw rotational speed so that the polymer A and the wax do not become compatibilized at the time of kneading.

Next, the cooled resin composition is pulverized to a required particle diameter in a pulverizing step. In the pulverizing step, the cooled resin composition is coarsely pulverized using, for example, a pulverizer such as a crusher, a hammer mill or a feather mill, and then finely pulverized using, for example, a Kryptron system (produced by Kawasaki Heavy Industries, Ltd.), a Super Rotor (produced by Nisshin Engineering), a Turbo Mill (produced by Turbo Kogyo), or an air jet type fine pulverizer.

Next, toner particles are obtained by classification by means of a classifier or sieving machine such as an inertial classification type elbow jet (produced by Nittetsu Mining Co., Ltd.), a centrifugal classification type Turboplex (produced by Hosokawa Micron Corp.), a TSP separator (produced by Hosokawa Micron Corp.) or a Faculty (produced by Hosokawa Micron Corp.) if necessary.

More preferably, the step for melt kneading the raw materials comprises: a first melt kneading step for melt kneading the amorphous polyester resin and the wax so as to obtain a first melt-kneaded product; a first pulverizing step for pulverizing the first melt-kneaded product so as to obtain a first powder; and a second melt kneading step for melt kneading at least the first powder and the polymer A so as to obtain a second inch-kneaded product, wherein the step for pulverizing the melt-kneaded product is a step for pulverizing the second melt-kneaded product.

By comprising such steps, the polymer A and the wax are more likely to be present as independent domains.

An amorphous polyester resin may also be mixed in the second melt kneading step. For example, it is possible to use the amorphous polyester resin L in the first melt kneading step and use the amorphous polyester resin H in the second melt kneading step.

An explanation will now be given of a case in which the toner particle is produced using an emulsification aggregation method.

In an emulsion aggregation method, a toner is produced by carrying out a dispersion step for producing fine particle-dispersed solutions comprising constituent materials of the toner; an aggregation step for aggregating fine particles comprising the constituent materials of the toner so as to control the particle diameter until the particle diameter of the toner is reached; a fusion step for subjecting the resin contained in the obtained aggregated particles to melt adhesion; a cooling step thereafter, a metal removal step for filtering the obtained toner and removing excess polyvalent metal ions; a filtering/washing step for filtering the obtained toner and washing with ion exchanged water or the like; and a step for removing water from the washed toner and drying.

That is, the toner production method preferably comprises a step for preparing fine particle-dispersed solutions of each raw materials of the toner, a step for mixing the fine particle-dispersed solutions of each raw materials and adding a flocculant so as to form aggregate particles: and a step for heating and fusing the aggregate particles.

Step for Preparing Resin Fine Particle-dispersed Solution (Dispersion Step)

A resin fine particle-dispersed solution can be prepared using a publicly known method, but is not limited to such methods. Examples of publicly known methods include an emulsion polymerization method, a self-emulsification method, a phase inversion emulsification method in which an aqueous medium is added to a resin solution dissolved in an organic solvent so as to emulsify the resin, or a forcible emulsification method in which a resin is subjected to a high temperature treatment in an aqueous medium without using an organic solvent so as to forcibly emulsify the resin.

Specifically, the binder resin (the amorphous polyester resin and the polymer A) is dissolved in an organic solvent that can dissolve these components, and a surfactant and a basic compound are added. In such cases, if the binder resin is a crystalline resin having a melting point, the resin should be melted by being heated to at least the melting point of the resin. Next, resin fine particles are precipitated by slowly adding an aqueous medium while agitating by means of a homogenizer or the like. A resin fine particle-dispersed aqueous solution is then prepared by heating or lowering the pressure so as to remove the solvent. Any solvent able to dissolve the resins mentioned above can be used as the organic solvent used for dissolving the resin, but use of an organic solvent that forms a uniform phase with water, such as toluene, is preferred from the perspective of suppressing the generation of coarse particles.

The type of surfactant used in the emulsification mentioned above is not particularly limited, but examples thereof include anionic surfactants such as sulfate ester salts, sulfonic acid salts, carboxylic acid salts, phosphate esters and soaps; cationic surfactants such as amine salts and quaternary ammonium salts; and non-ionic surfactants such as polyethylene glycol type surfactants, adducts of ethylene oxide to alkylphenols, and polyhydric alcohol type surfactants. It is possible to use one of these surfactants in isolation, or a combination of at least two types thereof.

Examples of the basic compound used in the dispersion step include inorganic bases such as sodium hydroxide and potassium hydroxide, and organic bases such as ammonia, triethylamine, trimethylamine, dimethylaminoethanol and diethylaminoethanol. It is possible to use one of these basic compounds in isolation, or a combination of at least two types thereof.

In addition, the 50% particle diameter on a volume basis (D50) of the binder resin fine particles in the resin fine particle-dispersed aqueous solution is preferably 0.05 μm to 1.0 μm, and more preferably 0.05 μm to 0.4 μm. By adjusting the 50% particle diameter (DSO) on a volume basis within the range mentioned above, it is easy to obtain a toner particle having a diameter 3 μm to 10 μm, which is a suitable volume average particle diameter for the toner particle.

Moreover, a dynamic light scattering particle size distribution analyzer (Nanotrac UPA-EX150 produced by Nikkiso Co., Ltd.) was used to measure the 50% particle diameter on a volume basis (D50).

Colorant Pine Particle-Dispersed Solution

A colorant fine particle-dispersed solution, which is used according to need, can be prepared using a publicly known method given below, but is not limited to such methods.

The colorant fine particle-dispersed solution can be prepared by mixing a colorant, an aqueous medium and a dispersing agent using a publicly known mixing machine such as a stirring machine, an emulsifying machine or a dispersing machine. It is possible to use a publicly known dispersing agent such as a surfactant or a polymer dispersing agent as the dispersing agent used in this case.

Whether the dispersing agent is a surfactant or a polymer dispersing agent, the dispersing agent can be removed by means of the washing step described below, but a surfactant is preferred from the perspective of washing efficiency.

Examples of the surfactant include anionic surfactants such as sulfate ester salts, sulfonic acid salts, phosphate esters and soaps; cationic surfactants such as amine salts and quaternary ammonium salts; and non-ionic surfactants such as polyethylene glycol type surfactants, adducts of ethylene oxide to alkylphenols, and polyhydric alcohol type surfactants.

Of these, non-ionic surfactants and anionic surfactants are preferred. In addition, it is possible to use a combination of a non-ionic surfactant and an anionic surfactant. It is possible to use one of these surfactants in isolation, or a combination of at least two types thereof. The concentration of the surfactant in the aqueous medium is preferably 0.5 mass % to 5 mass %.

The content of colorant fine particles in the colorant fine particle-dispersed solution is not particularly limited, but is preferably 1 mass % to 30 mass % relative to the total mass of the colorant fine particle-dispersed solution.

In addition, the dispersed particle diameter of colorant fine particles in the colorant fine particle-dispersed aqueous solution is preferably such that the 50% particle diameter on a volume basis (D50) is not more than 0.5 μm from the perspective of dispersibility of the colorant in the ultimately obtained toner. In addition, for similar reasons, the 90% particle diameter on a volume basis (D90) is preferably not more than 2 μm. Moreover, the dispersed particle diameter of colorant fine particles in the colorant fine particle-dispersed solution is measured using a dynamic light scattering particle size distribution analyzer (Nanotrac UPA-EX150 produced by Nikkiso Co., Ltd.).

Examples of publicly known mixing machines such as stirring machines, emulsifying machines and dispersing machines used when dispersing the colorant in the aqueous medium include ultrasonic homogenizers, jet mills, pressurized homogenizers, colloid mills, ball mills, sand mills and paint shakers. It is possible to use one of these mixing machines in isolation, or a combination thereof.

Wax Fine Particle-Dispersed Solution

A wax fine particle-dispersed solution can be prepared using the publicly known method given below, but is not limited to this publicly known method.

The wax fine particle-dispersed solution can be prepared by adding a wax to an aqueous medium comprising a surfactant, heating to a temperature that is at least the melting point of the wax, dispersing in a particulate state using a homogenizer having a strong shearing capacity (for example, a "Clearmix W-Motion" produced by M Technique Co., Ltd.) or a pressure discharge type dispersing machine (for example, a "Gaulin homogenizer" produced by Gaulin), and then cooling to a temperature that is lower than the melting point of the wax.

In addition, the dispersed particle diameter of the wax fine particles in the wax fine particle-dispersed solution is such that the 50% particle diameter on a volume basis (D50) is preferably approximately 0.03 μm to 1.0 μm, and more preferably approximately 0.1 μm to 0.5 μm. In addition, it is preferable for coarse wax particles having diameters of at least 1 μm not to be present.

If the dispersed particle diameter in the wax fine particle-dispersed solution falls within the range mentioned above, the wax can be finely dispersed in the toner, an outmigration effect can be exhibited to the maximum possible extent at the time of fixing, and good separation properties can be achieved. Moreover, the dispersed particle diameter of wax fine particles in the wax fine particle-dispersed solution can be measured using a dynamic light scattering particle size distribution analyzer (Nanotrac UPA-EX150 produced by Nikkiso Co., Ltd.).

In addition, by adding the amorphous polyester resin fine particle-dispersed solution when producing the wax fine particle-dispersed solution, it is possible to produce a mixed fine particle-dispersed solution comprising the amorphous polyester resin and the wax.

Specifically, the wax is added to an aqueous medium comprising a surfactant, heated to a temperature that is at least the melting point of the wax, and dispersed in the form of particles using a homogenizer or pressure discharge type dispersing machine mentioned above, and the amorphous polyester resin fine particle-dispersed solution is then added. Next, by cooling to a temperature that is lower than the melting point of the wax, it is possible to obtain a mixed fine particle-dispersed solution comprising the amorphous polyester resin and the wax.

In the thus produced mixed fine particle-dispersed solution comprising the amorphous polyester resin and the wax, the amorphous polyester resin, which is more hydrophilic than the wax, is localized close to the surface of fine particles in contact with the aqueous medium, and the wax, which is highly hydrophobic, is localized towards the inner part of fine particles. Therefore, the likelihood of contact between the wax and the polymer A decreases in the subsequent aggregation and fusion steps, and it becomes easier for the wax and the polymer A to form independent domains in the toner particle, which is desirable.

Mixing Step

In the mixing step, a mixed liquid is prepared by mixing the resin fine particle-dispersed solution, the wax fine particle-dispersed solution and, if necessary, the colorant fine particle-dispersed solution. It is possible to use a publicly known mixing apparatus, such as a homogenizer or a mixer.

Step for Forming Aggregate Particles (Aggregation Step)

In the aggregation step, fine particles contained in the mixed solution prepared in the mixing step are aggregated so as to form aggregates having the target particle diameter. Here, by adding and mixing a flocculant and applying heat and/or a mechanical force as appropriate, aggregates are formed through aggregation of resin fine particles and wax fine particles or the like.

It is preferable to use a flocculant that comprises a at least divalent metal ion as the flocculant.

A flocculant that comprises a at least divalent metal ion exhibits high cohesive strength and can achieve the desired objective even when added in a small amount. These flocculants can ionically neutralize ionic surfactants contained in the binder resin fine particle-dispersed solution, the wax fine particle-dispersed solution, and the like. As a result, these fine particles are aggregated as a result of salting out and ion crosslinking effects.

Examples of flocculants comprising at least divalent metal ions include at least divalent metal salts and metal salt polymers. Specific examples include divalent inorganic metal salts such as calcium chloride, calcium nitrate, magnesium chloride, magnesium sulfate and zinc chloride. Other examples include trivalent metal salts such as iron (III) chloride, iron (III) sulfate, aluminum sulfate and aluminum chloride. Other examples include inorganic metal salt polymers such as polyaluminum chloride, polyaluminum hydroxide and calcium polysulfide, but the flocculant is not limited to these. It is possible to use one of these in isolation, or a combination of at least two types thereof.

The flocculant may be added in the form of a dry powder or an aqueous solution dissolved in an aqueous medium, but adding the flocculant in the form of an aqueous solution is preferred in order to bring about uniform aggregation.

In addition, it is preferable for the flocculant to be added and mixed at a temperature that is at least the glass transition temperature or melting point of the resin contained in the mixed solution. By mixing under these temperature conditions, aggregation progresses relatively uniformly. When mixing the flocculant in the mixed solution, it is possible to use a publicly known mixing apparatus, such as a homogenizer or a mixer. The aggregation step is a step in which toner particle-sized aggregates are formed in the aqueous medium. The volume average particle diameter of aggregates produced in the aggregation step is preferably 3 μm to 10 μm. The volume average particle diameter can be measured using a particle size distribution analyzer that uses the Coulter principle (a Coulter Multisizer ill: produced by Beckman Coulter, Inc.).

Fusion Step

In the fusion step, an aggregation-stopping agent is added to a dispersed solution comprising the aggregates obtained in the aggregation step while agitating in the same way as in the aggregation step. Examples of aggregation-stopping agents include basic compounds which shift the equilibrium of acidic polar groups in the surfactant to the dissociation side and stabilize aggregated particles. Other examples include chelating agents, which partially dissociate ionic crosslinks between acidic polar groups in the surfactant and metal ions which are the flocculant and form coordination bonds with the metal ions, thereby stabilizing aggregated particles. Of these, chelating agents are preferred due to exhibiting a greater aggregation-stopping effect.

After the dispersed state of aggregated particles in the dispersed solution has stabilized as a result of the action of the aggregation-stopping agent, the aggregated particles are fused by being heated to a temperature that is at least the glass transition temperature or melting point of the binder resin.

The chelating agent is not particularly limited as long as a publicly known water-soluble chelating agent is used. Specific examples thereof include oxycarboxylic acids, such as tartaric acid, citric acid and gluconic acid, and sodium salts of these; iminodiacetic acid (IDA), nitrilotriacetic acid (NTA), ethylenediaminetetraacetic acid (EDTA) and sodium salts of these.

By coordinating to a metal ion in the flocculant present in the dispersed solution of aggregated particles, the chelating agent can change the environment in this dispersed solution from a state which is electrostatically unstable and in which aggregation readily occurs to a state which is electrostatically stable and in which aggregation is unlikely to occur. Due to this configuration, it is possible to suppress further aggregation of aggregated particles in the dispersed solution and stabilize the aggregated particles.

The chelating agent is preferably an organic metal salt comprising a at least trivalent carboxylic acid from the perspectives of exhibiting an effect even when added in a small amount and enabling toner particles having a sharp particle size distribution to be obtained.

In addition, the added quantity of the chelating agent is preferably 1 part by mass to 30 parts by mass, and more preferably 2.5 parts by mass to 15 parts by mass, relative to 100 parts by mass of the binder resin from the perspective of achieving both stabilization from an aggregated state and washing efficiency. Moreover, the 50% particle diameter on a volume basis (DSO) of the toner particles is preferably 3 μm to 10 μm.

Filtration step, Washing Step, Drying Step and Classification Step

Next, toner particles can be obtained by means of an emulsion aggregation method comprising subjecting toner particle solids to a filtration step and, if necessary, a washing step, a drying step and a classification step for adjusting particle size.

More preferably, the step for preparing fine particle-dispersed solutions of each raw materials comprises a step for obtaining a first fine particle-dispersed solution comprising the amorphous polyester resin and the wax; and a step for obtaining a second fine particle-dispersed solution comprising the polymer A, and the step for forming the aggregate particles is a step for mixing at least the first fine particle-dispersed solution and the second fine particle-dispersed solution and adding the flocculant so as form aggregate particles.

By comprising such steps, the polymer A and the wax are more likely to be present as independent domains.

In cases where the amorphous polyester resin L and the amorphous polyester resin H are used, it is possible to, for example, use the amorphous polyester resin L in the step for obtaining the first fine particle-dispersed solution and use the amorphous polyester resin H in the step for obtaining the second fine particle-dispersed solution.

Obtained toner particles may be used as-is as a toner. If necessary, the surface of toner particles obtained using these methods may be treated with an external additive.

Examples of methods for treating with an external additive include methods comprising blending prescribed quantities of a classified toner and a variety of publicly known external additives, and agitating and mixing using a mixing machine, such as a double cone mixer, a V type mixer, a drum type mixer, a supermixer, a Henschel mixer, a Nauta mixer, a Mechano Hybrid (produced by Nippon Coke and Engineering Co., Ltd.) or a Nobilta (produced by Hosokawa Micron Corp.), as an external addition machine.

Explanations will now be given of methods for measuring a variety of physical properties of the toner particle and raw materials.

Methods for Observing Toner Cross Section and Analyzing Amounts of Polymer A and Wax in Domains Firstly, flakes serving as an abundance standard sample are prepared.

The polymer A is thoroughly dispersed in a visible light-curable resin (Aronix LCR series D800), and curing is then carried out by irradiating with short wavelength light. A flaky sample measuring 250 nm is produced by cutting the obtained cured product using an ultramicrotome equipped with a diamond knife. A flaky sample of the wax is produced in a similar way.

In addition, the polymer A and the wax are mixed at a mass ratio of 30'70 or 70/30 and then melt kneaded so as to produce a melt-kneaded product. At this point it is preferable for the polymer A and the wax to be compatible and homogeneous, and kneading conditions such as temperature and cooling rate are adjusted as appropriate. Flaky samples are then produced in the same way by dispersing these kneaded products in a visible light-curable resin, curing and cutting.

Next, cross sections of these cut standard samples are observed using a transmission electron microscope (a JEM-2800 electron microscope produced by JEOL Ltd.) (TEM-EDX), and element mapping is carried out using EDX. Elements to be mapped are carbon, oxygen and nitrogen.

Mapping conditions are as follows.

Accelerating voltage: 200 kV

Electron beam irradiation size: 1.5 nm

Live time limit: 600 sec

Dead time: 20 to 30

Mapping resolution: 256×256

Based on the spectral intensity of the elements (average values for a 10 nm square area), the values of (oxygen element intensity/carbon element intensity) and (nitrogen element intensity/carbon element intensity) are calculated, and calibration curves are prepared for the mass ratio of the polymer A and the wax. In cases where monomer units in the polymer A contain nitrogen atoms, subsequent quantitative determination is carried out using the (nitrogen element intensity/carbon element intensity) calibration curve.

A toner sample is then analyzed.

A toner is thoroughly dispersed in a visible light-curable resin (Aronix LCR series D800), and curing is then carried out by irradiating with short wavelength light. A flaky sample measuring 250 nm is produced by cutting the obtained cured product using an ultramicrotome equipped with a diamond knife. Next, the cut sample is then observed using a transmission electron microscope (a JEM-2800 electron microscope produced by JEOL Ltd.) (TEM-EDX). A cross section image of the toner particle is acquired, and element mapping is carried out using EDX. Elements to be mapped are carbon, oxygen and nitrogen.

Moreover, the toner cross section to be observed is selected in the manner described below. First, the toner cross section area is determined from the toner cross section image, and the diameter (circle-equivalent diameter) of a circle having the same area as this cross section area is determined. Observations are carried out using only toner cross section images in which the absolute value of the difference between this circle-equivalent diameter and the weight average particle diameter (D4) of the toner is within 1.0 μm.

For domains confirmed by observed images, the values of (oxygen element intensity/carbon element intensity) and/or (nitrogen element intensity/carbon element intensity) are calculated based on the spectral intensity of the elements (average values for a 10 nm square area), and calibration curves are prepared for the mass ratio of the first resin and the ratio of the polymer A and the wax is calculated by comparing with the calibration curves mentioned above.

A domain in which the proportion of the polymer A is at least 80 mass % is denoted as domain A, and a domain in which the proportion of the wax is at least 80 mass % is denoted as domain B. Domains other than these are domains in which the polymer A and the wax are compatibilized.

After specifying domains confirmed by observed images as domain A, domain B or other domains, the areas of domains present in the toner cross section are determined by binarization. The total areal ratio of domain A and domain B relative to the total area of domains in a toner particle is determined in this way. In addition, the number-average value and areal ratio of the circle-equivalent diameter of domains among the cross-sectional area of the toner are also determined. 100 toner cross section images were observed, and the arithmetic mean value of these was used. Moreover, binarization was performed using Image Pro PLUS (produced by Nippon Roper K.K.).

Method for Separating Materials from Toner

Materials contained in the toner can be separated from the toner by utilizing differences in solubility in solvents of the materials.

First separation: A toner is dissolved in methyl ethyl ketone (MEK) at 23° C., and soluble matter (the amorphous polyester resin) and insoluble matter (polymer A, wax, colorant, inorganic fine particles, and the like) are separated.

Second separation: Insoluble matter obtained through the first separation (polymer A, wax, colorant, inorganic fine particles, and the like) is dissolved in MEK at 100° C., and soluble matter (polymer A and wax) and insoluble matter (colorant, inorganic fine particles, and the like) are separated.

Third separation: Soluble matter obtained through the second separation (polymer A and wax) is dissolved in chloroform at 23° C., and soluble matter (polymer A) and insoluble matter (wax) are separated.

Method for Measuring Content of Monomer Units in Amorphous Polyester Resin and Polymer A, and Method for Confirming Structure of Wax Using $^1$H-NMR measurements under the following conditions, the content of monomer units in the amorphous polyester resin and the polymer A was measured and the structure of the wax was confirmed.

Measurement apparatus: FT NMR apparatus (JNM-EX400 produced by JEOL Ltd.)

Measurement frequency: 400 MHz

Pulse conditions: 5.0 μs

Frequency range: 10,500 Hz

Number of accumulations: 64

Measurement temperature: 30° C.

Sample: 50 mg of a measurement sample is placed in a sample tube having an internal diameter of 5 mm, deuterated chloroform ($CDCl_3$) is added as a solvent, and the measurement sample is dissolved in a constant temperature bath at 40° C.

From among peaks attributable to constituent elements of the first monomer unit in the polymer A in an obtained $^1$H-NMR chart, a peak that is independent from peaks attributable to constituent elements of monomer units derived from other monomers is selected, and the integrated value $S_1$ of this peak is calculated.

Similarly, from among peaks attributable to constituent elements of the second monomer unit, a peak that is independent from peaks attributable to constituent elements of other monomer units is selected, and the integrated value $S_2$ of this peak is calculated.

Furthermore, in cases where a third monomer unit is contained, from among peaks attributable to constituent elements of the third monomer unit, a peak that is independent from peaks attributable to constituent elements of other monomer units is selected, and the integrated value $S_3$ of this peak is calculated.

The content of the first monomer unit is calculated in the manner described below using the integrated values $S_1$, $S_2$ and $S_3$. Moreover, $n_1$, $n_2$ and $n_3$ denote the number of hydrogens in constituent elements attributable to peaks observed for the respective segments.

$$\text{Content of first monomer unit (mol \%)}=\{(S_1/n_1)/((S_1/n_1)+(S_2/n_2)+(S_3/n_3))\}\times100$$

Similarly, the content of the second monomer unit and the third monomer unit are determined in the manner shown below.

$$\text{Content of second monomer unit (mol \%)}=\{(S_2/n_2)/((S_1/n_1)+(S_2/n_2)+(S_3/n_3))\}\times100$$

$$\text{Content of third monomer unit (mol \%)}=\{(S_3/n_3)/((S_1/n_1)+(S_2/n_2)+(S_3/n_3))\}\times100$$

Moreover, in cases where a polymerizable monomer in which hydrogen is not contained in constituent elements other than vinyl groups is used in the polymer A, $^{13}$C-NMR measurements are carried out in single pulse mode using $^{13}$C as a measurement atomic nucleus, and calculations are carried out in the same way as in $^1$H-NMR measurements.

In addition, in cases where a toner is produced using a suspension polymerization method, peaks attributable to release agents and other resins may overlap and independent peaks may not be observed. As a result, it may not be possible to calculate the content of monomer units derived from the polymerizable monomers in the polymer A. In such cases, it is possible to produce a polymer A' by carrying out suspension polymerization in the same way, but without using release agents or other resins, and analyze the polymer A' in the same way as the polymer A.

SP Value Calculation Method

SP values of polymerizable monomers and SP values of monomer units are determined in the manner described below in accordance with the calculation method proposed by Fedors.

For each of the polymerizable monomers, the evaporation energy (Δei) (cal/mol) and molar volume (Δvi) ($cm^3$/mol) of atoms and atomic groups in the molecular structure are determined from tables shown in "Polym. Eng. Sci., 14(2), 147 to 154 (1974)", and $(4.184\times\Sigma\Delta ei/\Sigma\Delta vi)^{0.5}$ is taken to be the SP value $(J/cm^3)^{0.5}$.

For example, the values of $SP_{11}$, $SP_{21}$ and $SP_{31}$ are calculated using a calculation method similar to that described above for atoms and atomic groups in a molecular structure in which a double bond in a polymerizable monomer is cleaved by polymerization.

Method for Measuring Weight Average Molecular Weight of Polymer A and Amorphous Polyester Resin by GPC The molecular weight (Mw) of THF-soluble matter in the polymer A and the amorphous polyester resin is measured by means of gel permeation chromatography (GPC), in the manner described below.

First, the toner is dissolved in tetrahydrofuran (THF) at room temperature over a period of 24 hours. A sample solution is then obtained by filtering the obtained solution using a solvent-resistant membrane filter having a pore diameter of 0.2 μm (a "Mishoridisk" produced by Tosoh Corporation). Moreover, the sample solution is prepared so that the concentration of THF-soluble components is approximately 0.8 mass %. Measurements are carried out using this sample solution under the following conditions.

Apparatus: HLC8120 GPC (detector: RD (produced by Tosoh Corporation)

Column: Combination of Shodex KF-801, 802, 803, 804, 805, 806 and 807 (produced by Showa Denko K.K.)

Eluant: Tetrahydrofuran (THF)

Flow rate: 1.0 mL/min

Oven temperature: 40.0° C.

Injected amount: 0.10 mL

When calculating the molecular weight of the sample, a molecular weight calibration curve is prepared using standard polystyrene resins (for example, product names "TSK Standard Polystyrene F-850, F-450, F-288, F-128, F-80, F-40. F-20, F-10, F-4, F-2, F-1, A-5000, A-2500, A-1000 and A-500", produced by Tosoh Corporation).

Method for Measuring Melting Point

The melting points of the polymer A and the wax are measured using a DSC Q1000 (produced by TA Instruments) under the following conditions.

Temperature increase rate: 10'C/min

Measurement start temperature: 20° C.

Measurement end temperature: 180° C.

Temperature calibration of the detector in the apparatus is performed using the melting points of indium and zinc, and heat amount calibration is performed using the heat of fusion of indium.

Specifically, approximately 5 mg of a sample is weighed out, placed in an aluminum pan, and subjected to differential scanning calorimetric measurements. An empty silver pan is used as a reference.

The melting point is taken to be the peak temperature of the maximum endothermic peak in a first temperature increase step.

Moreover, in cases where there are multiple peaks, the maximum endothermic peak is taken to be the peak for which the endothermic amount is greatest.

Method for Measuring Acid Value

The acid value of a resin or the like is the number of milligrams of potassium hydroxide required to neutralize acid contained in 1 g of a sample. Acid value is measured in accordance with JIS K 0070-1992, but is specifically measured using the following procedure.

(1) Reagent Preparation

A phenolphthalein solution is obtained by dissolving 1.0 g of phenolphthalein in 90 mL of ethyl alcohol (95 vol. %) and adding ion exchanged water up to a volume of 100 mL, 7 g of special grade potassium hydroxide is dissolved in 5 mL of water, and ethyl alcohol (95 vol. %) is added up to a volume of 1 L. A potassium hydroxide solution is obtained by placing the obtained solution in an alkali-resistant container so as not to be in contact with carbon dioxide gas or the like, allowing solution to stand for 3 days, and then filtering. The obtained potassium hydroxide solution is stored in the alkali-resistant container. The factor of the potassium hydroxide solution is determined by placing 25 mL of 0.1 mol/L hydrochloric acid in a conical flask, adding several drops of the phenolphthalein solution, titrating with the potassium hydroxide solution, and determining the factor from the amount of the potassium hydroxide solution required for neutralization. The 0.1 mol/L hydrochloric acid is produced in accordance with JIS K 8001-1998.

(2) Operation (A) Main Test 2.0 g of a pulverized sample is measured precisely into a 200 mL conical flask, 100 mL of a mixed toluene/ethanol (2:1) solution is added, and the sample is dissolved over a period of 5 hours. Next, several drops of the phenolphthalein solution are added as an indicator, and titration is carried out using the potassium hydroxide solution. Moreover, the endpoint of the titration is deemed to be the point when the pale crimson color of the indicator is maintained for approximately 30 seconds.

(B) Blank Test

Titration is carried out in the same way as in the operation described above, except that the sample is not used (that is, only a mixed toluene/ethanol (2:1) solution is used).

(3) The acid value is calculated by inputting the obtained results into the formula below.

$$A=[(C-B)\times f\times 5.61]/S$$

Here, A denotes the acid value (mg KOH/g), B denotes the added amount (mL) of the potassium hydroxide solution in the blank test, C denotes the added amount (mL) of the potassium hydroxide solution in the main test, f denotes the factor of the potassium hydroxide solution, and S denotes the mass (g) of the sample.

Measurement of BET Specific Surface Area of Inorganic Fine Particles

The BET specific surface area of the inorganic fine particles is measured in accordance with JIS Z8830 (2001). The specific measurement method is as follows.

A "TriStar 3000" automatic specific surface area/pore distribution measurement apparatus (produced by Shimadzu Corporation), which uses a fixed volume-based gas adsorption method as a measurement method, is used as the measurement apparatus. Setting of measurement conditions and analysis of measured data are carried out using "TriStar 3000 Version 4.00" dedicated software provided with the apparatus. In this apparatus, a vacuum pump, nitrogen gas piping and helium gas piping are connected. The BET specific surface area of the inorganic fine particles is deemed to be a value calculated by means of a BET multipoint method using nitrogen gas as the adsorbed gas.

Moreover, the BET specific surface area is calculated in the manner described below.

First, nitrogen gas is adsorbed by the inorganic fine particles, and the equilibrium pressure P (Pa) in the sample cell and the adsorbed amount of nitrogen on the external additive Va (mol/g) are measured at this point. In addition, an adsorption isotherm is obtained, with relative pressure Pr, which is a value obtained by dividing the equilibrium pressure P (Pa) in the sample cell by the saturated vapor pressure of nitrogen Po (Pa), being the horizontal axis and the adsorbed amount of nitrogen Va (mol/g) being the vertical axis. Next, the unimolecular layer adsorption amount Vm (mol/g), which is the adsorbed amount required to form a unimolecular layer on the surface of the external additive, is determined using the BET equation below.

$$Pr/Va(1-Pr)=1/(Vm\times C)+(C-1)\times Pr/(Vm\times C)$$

Here, C denotes the BET parameter, and is a variable that varies according to the type of measurement sample, the type of gas being adsorbed and the adsorption temperature.

If the X axis is Pr and the Y axis is Pr/Va(1−Pr), it can be understood that the BET equation is a straight line in which the slope is (C−1)/(Vm×C) and the intercept is 1/(Vm×C). This straight line is known as a BET plot.

$$\text{Slope of straight line}=(C-1)/(Vm\times C)$$

$$\text{Intercept of straight line}=1-(Vm\times C)$$

By plotting measured values for Pr and measured values for Pr/Va(1−Pr) on a graph and drawing a straight line using the least squares method, it is possible to calculate the slope of the straight line and the intercept value. By inputting these values into the numerical formula above and solving the obtained simultaneous equations, it is possible to calculate Vm and C.

Furthermore, the BET specific surface area S ($m^2/g$) of the inorganic fine particles is calculated from the calculated Vm value and the molecular cross sectional area of a nitrogen molecule (0.162 $nm^2$) using the formula below.

$$S=Vm\times N\times 0.162\times 10^{-18}$$

Here, N denotes Avogadro's number ($mol^{-1}$).

Measurements obtained using this apparatus are in accordance with the "TriStar 3000 user manual V4.0" provided with the apparatus, but measurements are carried out specifically using the procedure below.

The tare mass of a thoroughly washed and dried dedicated glass sample cell (stem diameter ⅜ inch, volume approximately 5 mL) is precisely measured. Next, approximately 0.1 g of inorganic fine particles are placed in the sample cell using a funnel.

The sample cell comprising the inorganic fine particles is placed in a "Vacuprep 061" pretreatment device (produced by Shimadzu Corporation) connected to a vacuum pump and nitrogen gas piping, and vacuum air removal is continued for approximately 10 hours at a temperature of 23° C. Moreover, when carrying out the vacuum air removal, air is gradually removed while adjusting a valve so that the inorganic fine particles are not drawn into the vacuum pump. The pressure inside the sample cell gradually decreases as air is removed, and ultimately reaches a pressure of approximately 0.4 Pa (approximately 3 millitorr). Following completion of the vacuum air removal, nitrogen gas is slowly injected into the sample cell, the sample cell is allowed to return to atmospheric pressure, and the sample cell is removed from the pretreatment device. In addition, the mass of the sample cell is precisely weighed, and the exact mass of the external additive is calculated from the difference between the mass of the sample cell and the tare mass mentioned above. Here, the sample cell is sealed with a rubber stopper while being weighed so that the external additive in the sample cell is not contaminated by moisture in the air, or the like.

Next, a dedicated "isothermal jacket" is attached to the stem part of the sample cell comprising the inorganic fine particles. Dedicated filler rods are then introduced into the sample cell, and the sample cell is placed in an analysis port of the apparatus. Moreover, the isothermal jacket is a cylindrical member which has an inner surface constituted from a porous material and an outer surface constituted from an impervious material and which can draw liquid nitrogen up to a certain level by means of capillary action.

Next, the sample cell, including connected equipment, is subjected to free space measurements. Free space is calculated by measuring the volume of the sample cell using helium gas at a temperature of 23° C., then using helium gas to measure the volume of the sample cell after the sample cell is cooled by means of liquid nitrogen, and then calculating the difference between these volumes. In addition, the saturated vapor pressure of nitrogen Po (Pa) is automatically measured separately using a Po tube housed in the apparatus.

Next, the sample cell is subjected to vacuum air removal, and then cooled by means of liquid nitrogen while continuing the vacuum air removal. Next, nitrogen gas is introduced incrementally into the sample cell and nitrogen molecules are adsorbed on the inorganic fine particles. Here, because the adsorption isotherm mentioned above is obtained by measuring the equilibrium pressure P (Pa) at appropriate times, this adsorption isotherm is converted into a BET plot. Moreover, the relative pressure Pr points at which data is collected are a total of 6 points, namely 0.05, 0.10, 0.15, 0.20, 0.25 and 0.30. A straight line is drawn from the obtained measurement data using the least squares method, and the value of Vm is calculated from the slope and intercept of this straight line. Furthermore, the BET specific surface area of the inorganic fine particles is calculated from this Vm value in the manner described above.

Measurement of Weight-average Particle Diameter (D4) of Toner Particles

The weight-average particle diameter (D4) of the toner particles is calculated by carrying out measurements using a precision particle size distribution measuring device which employees a pore electrical resistance method and uses a 100 μm aperture tube ("Coulter Counter Multisizer 3", registered trademark, produced by Beckman Coulter) and accompanying dedicated software that is used to set measurement conditions and analyze measured data ("Beckman Coulter Multisizer 3 Version 3.51", produced by Beckman Coulter) (no. of effective measurement channels: 25,000), and then analyzing the measurement data.

A solution obtained by dissolving special grade sodium chloride in deionized water at a concentration of approximately 1 mass %, such as "ISOTON II" (produced by Beckman Coulter), can be used as an aqueous electrolyte solution used in the measurements.

Moreover, the dedicated software was set up as follows before carrying out measurements and analysis.

On the "Standard Operating Method (SOM) alteration screen" in the dedicated software, the total count number in control mode is set to 50,000 particles, the number of measurements is set to 1, and the Kd value is set to "standard particle 10.0 μm" (produced by Beckman Coulter). By pressing the threshold value-noise level measurement button, threshold values and noise levels are automatically set. In addition, the current is set to 1600 μA, the gain is set to 2, the electrolyte solution is set to ISOTON II, and the "Flush aperture tube after measurement" option is checked.

On the "Screen for converting from pulse to particle diameter" in the dedicated software, the bin interval is set to logarithmic particle diameter, the particle diameter bin is set to 256 particle diameter bin, and the particle diameter range is set to 2 μm to 60 μm.

The specific measurement method is as described in steps (1) to (7) below.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) 30 mL of the aqueous electrolyte solution is placed in a 100 mL glass flat bottomed beaker, and approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries. Ltd.) 3-fold with deionized water, is added to the beaker as a dispersant.

(3) A prescribed amount of deionized water is placed in a water bath of an "Ultrasonic Dispersion System Tetora 150" (produced by Nikkaki Bios Co., Ltd.) having an electrical output of 120 W, in which two oscillators having an oscillation frequency of 50 kHz are housed so that their phases are staggered by 180°, and approximately 2 mL of the Contaminon N is added to the water bath.

(4) The beaker mentioned in section (2) above is placed in a beaker-fixing hole of the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. Moreover, when carrying out the ultrasonic wave dispersion, the temperature of the water bath is adjusted as appropriate to a temperature of 10° C. to 40° C.

(6) The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50.000.

(7) The weight-average particle diameter (D4) is calculated by analyzing measurement data using the accompanying dedicated software. Moreover, when setting the graph/vol. % with the dedicated software, the "average diameter" on the analysis/volume-based statistical values (arithmetic mean) screen is weight-average particle diameter (D4).

EXAMPLES

The present invention will now be explained in further detail by means of examples, but these examples in no way limit the present invention. Moreover, number of parts in formulations below are on a mass basis unless explicitly stated otherwise.

Production Example of Polymer A1

Solvent (toluene): 100.0 parts

Monomer composition: 100.0 parts (The monomer composition is obtained by mixing behenyl acrylate, acrylonitrile and styrene at the proportions shown below)

(Behenyl acrylate (first polymerizable monomer): 67.0 parts (28.9 mol %))

(Methacrylonitrile (second polymerizable monomer): 22.0 parts (53.8 mol %))

(Styrene (third polymerizable monomer): 11.0 parts (17.3 mol %))

Polymerization initiator [t-butyl peroxypivalate (Perbutyl PV, produced NOF Corp.)]: 0.5 parts In a nitrogen atmosphere, the materials listed above were placed in a reaction vessel equipped with a reflux condenser, a stirrer, a temperature gauge and a nitrogen inlet tube. While being stirred at 200 rpm, the contents of the reaction vessel were heated to 70° C. and a polymerization reaction was carried out for 12 hours, thereby obtaining a solution in which a polymer of the monomer composition was dissolved in toluene. The temperature of the solution was then lowered to 25° C., and the solution was introduced into 1000.0 parts of methanol under stirring, thereby causing methanol-insoluble matter to precipitate. The thus obtained methanol-insoluble components were filtered and washed with methanol, and then vacuum dried at 40° C. for 24 hours, thereby obtaining a polymer A1. The polymer A1 had a weight average molecular weight of 33,400, a melting point of 62'C an acid value of 0.0 mg KOH/g.

As a result of NMR analysis, the polymer A1 contained 28.9 mol % of monomer units derived from behenyl acrylate. 53.8 mol % of monomer units derived from methacrylonitrile and 17.3 mol % of monomer units derived from styrene. SP values of monomer units derived from polymerizable monomers were calculated using the method described above.

Preparation of Urea Group-Comprising Monomer 50.0 parts of dibutylamine was placed in a reaction vessel. 5.0 parts of Karenz MOI (2-isocyanatoethyl methacrylate) was then added dropwise under stirring at room temperature. Following completion of the dropwise addition, stirring was carried out for 2 hours. A urea group-comprising monomer was then prepared by removing unreacted dibutylamine using an evaporator.

Production Examples of Polymers A2 to A23

Polymers A2 to A23 were obtained by carrying out a reaction in the same way as in the production example of the polymer A1, except that the types and numbers of parts of polymerizable monomers were altered as shown in Table 1. Physical properties of the polymers A1 to A23 are shown in Tables 2 and 3.

TABLE 1

| Polymer | First polymerizable monomer | | | Second polymerizable monomer | | | Third polymerizable monomer | | |
|---|---|---|---|---|---|---|---|---|---|
| A | Type | Parts | mol % | Type | Parts | mol % | Type | Parts | mol % |
| 1 | BEA | 67.0 | 28.9 | MN | 22.0 | 53.8 | St | 11.0 | 17.3 |
| 2 | BEA | 50.0 | 26.0 | HPMA | 40.0 | 55.0 | St | 10.0 | 19.0 |
| 3 | BEA | 65.0 | 27.6 | AM | 25.0 | 56.9 | St | 10.0 | 15.5 |
| 4 | BEA | 45.0 | 30.3 | UR | 47.0 | 50.0 | St | 8.0 | 19.7 |
| 5 | BEA | 60.0 | 26.2 | MA | 30.0 | 57.9 | St | 10.0 | 15.9 |
| 6 | BEA | 65.0 | 26.2 | VA | 18.0 | 57.9 | St | 17.0 | 15.9 |
| 7 | BEA | 61.0 | 29.2 | AA | 9.0 | 42.8 | St | 30.0 | 28.0 |
| 8 | BEA | 67.0 | 25.3 | AN | 22.0 | 59.5 | St | 11.0 | 15.2 |
| 9 | BEA | 33.0 | 8.0 | MN | 67.0 | 92.0 | — | — | — |
| 10 | BEA | 86.0 | 54.6 | MN | 10.0 | 36.1 | St | 4.0 | 9.3 |
| 11 | BEA | 84.0 | 54.4 | MN | 6.0 | 22.0 | St | 10.0 | 23.6 |
| 12 | BEA | 82.0 | 52.0 | MN | 5.0 | 18.0 | St | 13.0 | 30.0 |
| 13 | BEA | 77.0 | 47.8 | — | — | — | St | 23.0 | 52.2 |

TABLE 1-continued

| Polymer | First polymerizable monomer | | | Second polymerizable monomer | | | Third polymerizable monomer | | |
|---|---|---|---|---|---|---|---|---|---|
| A | Type | Parts | mol % | Type | Parts | mol % | Type | Parts | mol % |
| 14 | BEA | 19.0 | 6.0 | — | — | — | St | 81.0 | 94.0 |
| 15 | BEA | 45.0 | 18.3 | — | — | — | St | 55.0 | 81.7 |
| 16 | BEA | 72.0 | 41.3 | — | — | — | St | 28.0 | 58.7 |
| 17 | BEA | 84.0 | 59.0 | — | — | — | St | 16.0 | 41.0 |
| 18 | STA | 70.0 | 42.8 | — | — | — | St | 30.0 | 57.2 |
| 19 | MYA | 60.0 | 24.1 | — | — | — | St | 40.0 | 75.9 |
| 20 | HA | 75.0 | 51.3 | — | — | — | St | 25.0 | 48.7 |
| 21 | BEA | 12.0 | 3.6 | — | — | — | St | 88.0 | 96.4 |
| 22 | BEA | 86.0 | 62.7 | — | — | — | St | 14.0 | 37.3 |
| 23 | BEA | 100.0 | 100.0 | — | — | — | — | — | — |

Abbreviations used in Tables 1 to 3 are as follows.

BEA: Behenyl acrylate
STA: Stearyl acrylate
MYA: Myricyl acrylate
HA: Hexadecyl acrylate
MN: Methacrylonitrile
AN: Acrylonitrile
AM: Acrylamide
HPMA: 2-hydroxypropyl methacrylate
UR: Urea group-comprising monomer
MA: Methyl acrylate
VA: Vinyl acetate
AA: Acrylic acid
St: Styrene

TABLE 2

| Polymer | First monomer unit | | Second monomer unit | | Third monomer unit | |
|---|---|---|---|---|---|---|
| A | Monomer | $SP_{11}$ | Monomer | $SP_{21}$ | Monomer | $SP_{31}$ |
| 1 | BEA | 18.25 | MN | 25.96 | St | 20.11 |
| 2 | BEA | 18.25 | HPMA | 24.12 | St | 20.11 |
| 3 | BEA | 18.25 | AM | 39.25 | St | 20.11 |
| 4 | BEA | 18.25 | UR | 21.74 | St | 20.11 |
| 5 | BEA | 18.25 | MA | 25.65 | St | 20.11 |
| 6 | BEA | 18.25 | VA | 21.60 | St | 20.11 |
| 7 | BEA | 18.25 | AA | 28.72 | St | 20.11 |
| 8 | BEA | 18.25 | AN | 29.43 | St | 20.11 |
| 9 | BEA | 18.25 | MN | 25.96 | — | — |
| 10 | BEA | 18.25 | MN | 25.96 | St | 20.11 |
| 11 | BEA | 18.25 | MN | 25.96 | St | 20.11 |
| 12 | BEA | 18.25 | MN | 25.96 | St | 20.11 |
| 13 | BEA | 18.25 | — | — | St | 20.11 |
| 14 | BEA | 18.25 | — | — | St | 20.11 |
| 15 | BEA | 18.25 | — | — | St | 20.11 |
| 16 | BEA | 18.25 | — | — | St | 20.11 |
| 17 | BEA | 18.25 | — | — | St | 20.11 |
| 18 | STA | 18.39 | — | — | St | 20.11 |
| 19 | MYA | 18.08 | — | — | St | 20.11 |
| 20 | HA | 18.47 | — | — | St | 20.11 |
| 21 | BEA | 18.25 | — | — | St | 20.11 |
| 22 | BEA | 18.25 | — | — | St | 20.11 |
| 23 | BEA | 18.25 | — | — | — | — |

TABLE 3

| Polymer A | Mw | $T_p$ [° C.] | Av [mgKOH/g] |
|---|---|---|---|
| 1 | 33400 | 62 | 0.0 |
| 2 | 32500 | 59 | 0.0 |
| 3 | 28900 | 59 | 0.0 |
| 4 | 33000 | 56 | 0.0 |

TABLE 3-continued

| Polymer A | Mw | $T_p$ [° C.] | Av [mgKOH/g] |
|---|---|---|---|
| 5 | 31400 | 55 | 0.0 |
| 6 | 29600 | 56 | 0.0 |
| 7 | 27700 | 57 | 65.0 |
| 8 | 29600 | 56 | 0.0 |
| 9 | 32000 | 55 | 0.0 |
| 10 | 30800 | 56 | 0.0 |
| 11 | 30800 | 56 | 0.0 |
| 12 | 30800 | 56 | 0.0 |
| 13 | 29600 | 53 | 0.0 |
| 14 | 33000 | 51 | 0.0 |
| 15 | 32700 | 51 | 0.0 |
| 16 | 32200 | 52 | 0.0 |
| 17 | 31000 | 54 | 0.0 |
| 18 | 32800 | 52 | 0.0 |
| 19 | 29700 | 60 | 0.0 |
| 20 | 31100 | 51 | 0.0 |
| 21 | 33900 | 52 | 0.0 |
| 22 | 33900 | 52 | 0.0 |
| 23 | 32100 | 57 | 0.0 |

In the tables, $T_p$ denotes melting point.

Production Example of Amorphous Polyester Resin L

Polyoxypropylene(2.2)-2,2-bis(4-hydroxyphenyl)propane: 59.0 parts (0.15 moles; 80.0 mol % relative to the total number of moles of polyhydric alcohol)

Polyoxyethylene(2.2)-2,2-bis(4-hydroxyphenyl)propane: 13.6 parts (0.04 moles; 20.0 mol % relative to the total number of moles of polyhydric alcohol)

Terephthalic acid: 20.8 parts (0.13 moles; 80.0 mol % relative to the total number of moles of polycarboxylic acid)

Trimellitic anhydride: 6.6 parts (0.03 moles: 20.0 mol % relative to the total number of moles of polycarboxylic acid)

The materials listed above were introduced into a reaction vessel equipped with a condenser tube, a stirrer, a nitrogen inlet tube and a thermocouple. Next, tin 2-ethylhexanoate as a catalyst (an esterification catalyst) was added in an amount of 1.5 parts relative to 100 parts of the overall monomer amount. Next, the flask was purged with nitrogen gas, the temperature was gradually increased while stirring the contents of the flask, and a reaction was allowed to progress for 3 hours while stirring the contents of the flask at a temperature of 200° C.

Furthermore, the pressure inside the reaction vessel was lowered to 8.3 kPa and held at this pressure for 1 hour, after which the contents of the reaction vessel were cooled to a temperature of 180° C., a reaction was allowed to progress, and once it had been confirmed that the softening point, as measured in accordance with ASTM D36-86, had reached 90° C., the temperature was lowered and the reaction was terminated. The obtained amorphous polyester resin L had a softening point (Tm) of 97° C. and an acid value of 7 mg KOH/g.

Production Example of Amorphous Polyester Resin H

- Polyoxypropylene(2.2)-2,2-bis(4-hydroxyphenyl)propane: 70.4 parts (0.18 moles; 100.0 mol % relative to the total number of moles of polyhydric alcohol)
- Terephthalic acid: 24.4 parts (0.15 moles; 82.0 mol % relative to the total number of moles of polycarboxylic acid)
- Adipic acid: 3.7 parts (0.03 moles; 14.0 mol % relative to the total number of moles of polycarboxylic acid)
- Tin di(2-ethylhexanoate): 0.8 parts The materials listed above were weighed out and introduced into a reaction vessel equipped with a condenser tube, a stirrer, a nitrogen inlet tube and a thermocouple. Next, the flask was purged with nitrogen gas, the temperature was gradually increased while stirring the contents of the flask, and a reaction was allowed to progress for 3 hours while stirring the contents of the flask at a temperature of 200° C.

Next, the pressure inside the reaction vessel was lowered to 8.3 kPa and held at this pressure for 1 hour, after which the contents of the reaction vessel were cooled to a temperature of 180° C. and the reaction vessel was allowed to return to atmospheric pressure (a first reaction step).

- Trimellitic anhydride: 1.5 parts (0.01 moles; 4.0 mol % relative to the total number of moles of polycarboxylic acid)
- Tert-butylcatechol (polymerization inhibitor): 0.1 parts Next, the materials listed above were added, the pressure inside the reaction vessel was lowered to 8.3 kPa, a reaction was allowed to progress for 12 hours while maintaining a temperature of 145° C., and the temperature was lowered so as to terminate the reaction (second reaction step), thereby obtaining an amorphous polyester resin H. The obtained amorphous polyester resin H had a softening point (Tm) of 150° C. and an acid value of 10 mg KOH/g.

Synthesis Example of Amorphous Vinyl Resin 1

50 parts of xylene was placed in an autoclave, which was then purged with nitrogen, after which the temperature of the autoclave was increased to 185° C. in a tightly sealed state under stirring. Polymerization was carried out by continuously adding a mixed solution of 90 parts of styrene, 3 parts of methyl methacrylate, 2 parts of n-butyl acrylate, 2 parts of di-t-butyl peroxide and 20 parts of xylene added dropwise over a period of 4 hours while controlling the temperature inside the autoclave to 170° C. An amorphous vinyl resin 1 was obtained by maintaining this temperature for a further 1 hour to complete polymerization and remove the solvent. The obtained resin had a weight average molecular weight (Mw) of 7000 and a softening point (Tm) of 102° C.

Production Example of Mixed Resin of Polyester and Wax

- Amorphous polyester resin L: 65.00 parts
- Hydrocarbon wax: 5.00 parts (Fischer Tropsch wax; peak temperature of maximum endothermic peak: 90° C.)

Using a Henschel mixer (an FM-75 model, produced by Nippon Coke and Engineering Co., Ltd.), the materials listed above were mixed at a rotational speed of 20 $s^{-1}$ for a period of 3 minutes, and then kneaded using a twin screw kneader set to a barrel temperature of 100° C. (a PCM-30 model, produced by lkegai Corporation) at a discharge temperature of 105° C.

The obtained kneaded product was cooled and then coarsely pulverized to a size of not more than 1 mm using a hammer mill so as to obtain a coarsely pulverized product 1 of a mixed resin of a polyester and a wax.

Toner Particle Production Example 1

- Coarsely pulverized product 1 of a mixed resin of a polyester and a wax: 70.00 parts
- Amorphous polyester resin H: 30.00 parts
- Polymer A1: 5.00 parts
- C.I. Pigment Blue 15:3: 5.00 parts Using a Henschel mixer (an FM-75 model, produced by Nippon Coke and Engineering Co., Ltd.), the materials listed above were mixed at a rotational speed of 25 $s^{-1}$ for a period of 5 minutes, and then kneaded at a discharge temperature of 115° C. using a twin screw kneader (a PCM-30 model, produced by Ikegai Corporation) set to a barrel temperature of 100° C. and a screw rotational speed of 3 $s^{-1}$. The obtained kneaded product was cooled at a cooling rate of 30° C./s and then coarsely pulverized to a size of not more than 1 mm using a hammer mill so as to obtain a coarsely pulverized product.

The obtained coarsely pulverized product was then finely pulverized using a mechanical pulverizer (a T-250, produced by Freund Turbo Corporation). A toner particle 1 was then obtained by carrying out classification using a Faculty F-300 (produced Hosokawa Micron Corp.) under operating conditions whereby the rotational speed of a classifying rotor was 130 $s^{-1}$ and the rotational speed of a dispersing rotor was 120 $s^{-1}$. The weight-average particle diameter (D4) was 6.1 μm.

Toner Particle Production Example 2

- Amorphous polyester resin L: 65.00 parts
- Amorphous polyester resin H: 30.00 parts
- Polymer A1: 5.00 parts
- Hydrocarbon wax: 5.00 parts (Fischer Tropsch wax; peak temperature of maximum endothermic peak: 90° C.)

- C.I. Pigment Blue 15:3: 5.00 parts

Using a Henschel mixer (an FM-75 model, produced by Nippon Coke and Engineering Co., Ltd.), the materials listed above were mixed at a rotational speed of 25 $s^{-1}$ for a period of 5 minutes, and then kneaded at a discharge temperature of 115° C. using a twin screw kneader (a PCM-30 model, produced by lkegai Corporation) set to a barrel temperature of 100° C. and a screw rotational speed of 3 $s^{-1}$. The obtained kneaded product was cooled at a cooling rate of 30° C./s and then coarsely pulverized to a size of not more than 1 mm using a hammer mill so as to obtain a coarsely pulverized product.

The obtained coarsely pulverized product was then finely pulverized using a mechanical pulverizer (a T-250, produced by Freund Turbo Corporation). A toner particle 2 was then obtained by carrying out classification using a Faculty F-300 (produced Hosokawa Micron Corp.) under operating conditions whereby the rotational speed of a classifying rotor was 130 $s^{-1}$ and the rotational speed of a dispersing rotor was 120 $s^{-1}$. The weight-average particle diameter (D4) was 6.1 μm.

Toner Particle Production Example 5

A toner particle 5 was obtained using a similar procedure to that used in toner particle production example 1, except that an ester wax (carnauba wax; peak temperature of maximum endothermic peak: 85° C.) was used instead of a hydrocarbon wax. The weight-average particle diameter (D4) was 6.1 μm.

Toner Particle Production Examples 6 to 38

Toner Particles 6 to 38 were obtained using a similar procedure to that used in toner particle production example 1, except that the added quantities of the amorphous polyester resin L and the amorphous polyester resin H, the type and added quantity of the polymer A, the added quantity of the amorphous vinyl resin 1 and the screw rotational speed, discharge temperature and cooling rate at the time of kneading were altered as shown in Table 4. The weight-average particle diameter (D4) was 6.1 μm.

Production Example of Amorphous Polyester Resin L Fine Particle-Dispersed Solution Tetrahydrofuran (produced by Wako Pure Chemical Industries, Ltd.): 300 parts
Amorphous polyester resin L: 100 parts
Anionic surfactant (Neogen RK produced by Dai-ichi Kogyo Seiyaku Co., Ltd.): 0.5 parts The materials listed above were weighed out, mixed and dissolved.

Next, 20.0 parts of 1 mol/L aqueous ammonia was added and stirred at 4000 rpm using a T.K. Robomix ultrahigh speed stirrer (produced by Primix Corporation). 700 parts of ion exchanged water was then added at a rate of 8 g/min so as to precipitate amorphous polyester resin L fine particles. An aqueous dispersed solution comprising amorphous polyester resin L fine particles at a concentration of 20 mass % (a dispersed solution of amorphous polyester resin L fine particles) was then obtained by removing the tetrahydrofuran using an evaporator and adjusting the concentration by means of ion exchanged water.

The 50% particle diameter on a volume basis (D50) of amorphous polyester resin L fine particles was 0.13 μm.

Production Example of Amorphous Polyester Resin H Fine Particle-Dispersed Solution Tetrahydrofuran (produced by Wako Pure Chemical Industries, Ltd.): 300 parts
Amorphous polyester resin H: 100 parts
Anionic surfactant (Neogen RK produced by Dai-ichi Kogyo Seiyaku Co., Ltd.): 0.5 parts The materials listed above were weighed out, mixed and dissolved.

Next, 20.0 parts of 1 mol/L aqueous ammonia was added and stirred at 4000 rpm using a T.K. Robomix ultrahigh speed stirrer (produced by Primix Corporation). 700 parts of ion exchanged water was then added at a rate of 8 g/min so as to precipitate amorphous polyester resin H fine particles. An aqueous dispersed solution comprising amorphous polyester resin H fine particles at a concentration of 20 mass % (a dispersed solution of amorphous polyester resin H fine particles) was then obtained by removing the tetrahydrofuran using an evaporator and adjusting the concentration by means of ion exchanged water.

The 50% particle diameter on a volume basis (D50) of amorphous polyester resin H fine particles was 0.14 μm.

Production Example of Polymer A1 Fine Particle-Dispersed Solution

Tetrahydrofuran (produced by Wako Pure Chemical Industries, Ltd.): 300 parts
Polymer A1: 100 parts
Anionic surfactant (Neogen RK produced by Dai-ichi Kogyo Seiyaku Co., Ltd.): 0.5 parts The materials listed above were weighed out, mixed and dissolved.

Next, 20.0 parts of 1 mol/L aqueous ammonia was added and stirred at 4000 rpm using a T.K Robomix ultrahigh speed stirrer (produced by Primix Corporation). 700 parts of ion exchanged water was then added at a rate of 8 g/min so as to precipitate amorphous polyester resin L fine particles. An aqueous dispersed solution comprising polymer A1 fine particles at a concentration of 20 mass % (a dispersed solution of polymer A1 fine particles) was then obtained by removing the tetrahydrofuran using an evaporator and adjusting the concentration by means of ion exchanged water.

The 50% particle diameter on a volume basis (D50) of polymer A1 fine particles was 0.12 μm.

Production Example of Wax Fine Particle-Dispersed Solution

Hydrocarbon wax: 100 parts
(Fischer Tropsch wax; peak temperature of maximum endothermic peak: 90° C.)
Anionic surfactant (Neogen RK produced by Dai-ichi Kogyo Seiyaku Co., Ltd.): 5 parts
Ion exchanged water: 395 parts The materials listed above were weighed out and placed in a mixing vessel equipped with a stirring device, heated to 90° C. and subjected to dispersion treatment for 60 minutes by being circulated in a Clearmix W-Motion (produced by M Technique Co., Ltd.). The dispersion treatment conditions were as follows.

Outer diameter of rotor 3 cm
Clearance: 0.3 mm
Rotational speed of rotor: 19,000 r/min
Rotational speed of screen: 19,000 r/min Following the dispersion treatment, an aqueous dispersed solution in which the concentration of wax fine particles was 20% (a wax fine particle-dispersed solution) was obtained by cooling to 40° C. under cooling conditions such that the rotor rotational speed was 1000 r/min. the screen rotational speed was 0 r/min and the cooling rate was 10° C./min.

The 50% particle diameter on a volume basis (D50) of the wax fine particles was measured using a dynamic light scattering particle size distribution analyzer (a Nanotrac UPA-EX150 produced by Nikkiso Co., Ltd.), and found to be 0.15 μm.

Production of Colorant Fine Particle-Dispersed Solution

C.I. Pigment Blue 15:3: 50.0 parts

Anionic surfactant (Neogen RK produced by Dai-ichi Kogyo Seiyaku Co., Ltd.): 7.5 parts Ion exchanged water: 442.5 parts An aqueous dispersed solution comprising colorant fine particles at a concentration of 10 mass % (a colorant fine particle-dispersed solution) was obtained by weighing out, mixing and dissolving the materials listed above and dispersing for approximately 1 hour using a Nanomizer high pressure impact disperser (produced by Yoshida Kikai Co., Ltd.) so as to disperse the colorant.

The 50% particle diameter on a volume basis (D50) of the colorant fine particle was measured using a dynamic light scattering particle size distribution analyzer (a Nanotrac UPA-EX150 produced by Nikkiso Co., Ltd.), and found to be 0.20 μm.

Preparation of Dispersed Solution Comprising Mixed Fine Particles of Amorphous Polyester Resin L and Wax Hydrocarbon wax:

(Fischer Tropsch wax: peak temperature of maximum endothermic peak: 90° C.): 100 parts Anionic surfactant (Neogen RK produced by Dai-ichi Kogyo Seiyaku Co., Ltd.): 5 parts Ion exchanged water: 395 parts The materials listed above were weighed out and placed in a mixing vessel equipped with a stirring device, heated to 90° C. and subjected to dispersion treatment for 60 minutes by being circulated in a Clearmix W-Motion (produced by M Technique Co., Ltd.). The dispersion treatment conditions were as follows.

Outer diameter of rotor 3 cm

Clearance: 0.3 mm

Rotational speed of rotor 19,000 r/min

Rotational speed of screen: 19,000 r/min

Next, 6500 parts of an amorphous polyester resin L fine particle-dispersed solution was added dropwise over a period of 1 hour while maintaining a heated state of 90° C. An aqueous dispersed solution having a concentration of 20 mass % in which amorphous polyester resin L and the wax were mixed at a ratio of 13:1 (a mixed fine particle-dispersed solution comprising amorphous polyester resin L and the wax) was then obtained by cooling to 40° C. under cooling conditions such that the rotor rotational speed was 1000 r/min, the screen rotational speed was 0 r/min and the cooling rate was 10° C./min.

Toner Particle Production Example 3

Dispersed solution comprising mixed fine particles of amorphous polyester resin L and wax: 350 parts Amorphous polyester resin H fine particle-dispersed solution: 150 parts Polymer A1 fine particle-dispersed solution: 25 parts Colorant fine particle-dispersed solution: 25 parts Ion exchanged water: 160 parts The materials listed above were placed in a round stainless steel flask and mixed. Next, the obtained mixed solution was dispersed for 10 minutes at 5000 r/min using a homogenizer (an Ultratarax T50 produced by IKA). A 1.0% aqueous solution of nitric acid was added to adjust the pi to 3.0, and the mixed solution was then heated to 58° C. in a heating water bath while appropriately adjusting the speed of rotation of a stirring blade so that the mixed solution was stirred.

The volume average particle diameter of the formed aggregated particles was appropriately confirmed using a Coulter Multisizer III, and when aggregated particles having a weight average particle diameter (D4) of approximately 6.00 μm were formed, the pH was adjusted to 9.0 using a 5% aqueous solution of sodium hydroxide. The solution was then heated to 75° C. while continuing the stirring. The aggregate particles were fused together by maintaining a temperature of 75° C. for 1 hour.

Crystallization of the polymer was then facilitated by cooling to 50° C. and maintaining this temperature for 3 hours.

The mixture was then cooled to 25° C., filtered, subjected to solid-liquid separation, and then washed with ion exchanged water. Following completion of the washing, toner particle 3 having a weight-average particle diameter (D4) of approximately 6.1 μm was obtained by drying with a vacuum dryer.

Toner Particle Production Example 4

Amorphous polyester resin 1, fine particle-dispersed solution: 325 parts

Amorphous polyester resin H fine particle-dispersed solution: 150 parts

Polymer A1 fine particle-dispersed solution: 25 parts

Colorant fine particle-dispersed solution: 25 parts

Wax fine particle-dispersed solution: 25 parts

Ion exchanged water: 160 parts

The materials listed above were placed in a round stainless steel flask and mixed. Next, the obtained mixed solution was dispersed for 10 minutes at 5000 r/min using a homogenizer (an Ultratarax T50 produced by IKA). A 1.0% aqueous solution of nitric acid was added to adjust the pi to 3.0, and the mixed solution was then heated to 58° C. in a heating water bath while appropriately adjusting the speed of rotation of a stirring blade so that the mixed solution was stirred.

The volume average particle diameter of the formed aggregated particles was appropriately confirmed using a Coulter Multisizer III, and when aggregated particles having a weight average particle diameter (D4) of approximately 6.00 μm were formed, the pH was adjusted to 9.0 using a 5% aqueous solution of sodium hydroxide. The solution was then heated to 75° C. while continuing the stirring. The aggregate particles were fused together by maintaining a temperature of 75° C. for 1 hour.

Crystallization of the polymer was then facilitated by cooling to 50° C. and maintaining this temperature for 3 hours.

The mixture was then cooled to 25° C., filtered, subjected to solid-liquid separation, and then washed with ion exchanged water. Following completion of the washing, toner particle 4 having a weight-average particle diameter (D4) of approximately 6.1 μm was obtained by drying with a vacuum dryer.

Toner Production Example 1

Toner particle 1: 100 parts

Silica fine particles 1 (hydrophobically treated silica fine particles having a number average primary particle diameter of 15 nm): 0.5 parts Silica fine particles 2 (hydrophobically treated silica fine particles having a number average primary particle diameter of 80 nm): 1.0 parts Toner 1 was obtained by mixing the materials listed above in an FM-10C Henschel mixer (produced by Mitsui Miike Kakoki Corporation) at a rotation speed of 30 $s^{-1}$ and a rotation time of 10 min. Physical properties are shown in Table 5.

Toner Production Examples 2 to 38

Toners 2 to 38 were obtained by carrying out production in the same way as in toner production example 1 except that toner particles 2 to 38 were used instead of the toner particle 1. Physical properties are shown in Table 5.

TABLE 4

| | Formulation | | | | | | | | Production conditions | | | |
|---|---|---|---|---|---|---|---|---|---|---|---|---|
| Tones particle No. | Amorphous polyester L (parts) | Amorphous polyester H (parts) | Polymer A | Parts | Other resin | Parts | Wax | Parts | Producion method | Discharge temperature ° C. | Rotation speed s-1 | Cooling Rate ° C./sec |
| 1 | 65.00 | 30.00 | 1 | 5.00 | — | — | Hydrocarbon | 5.00 | Melt kneading | 115 | 3 | 30 |
| 2 | 65.00 | 30.00 | 1 | 5.00 | — | — | Hydrocarbon | 5.00 | Melt kneading | 115 | 3 | 30 |
| 3 | 65.00 | 30.00 | 1 | 5.00 | — | — | Hydrocarbon | 5.00 | Emulsion aggregation | — | — | — |
| 4 | 65.00 | 30.00 | 1 | 5.00 | — | — | Hydrocarbon | 5.00 | Emulsion aggregation | — | — | — |
| 5 | 65.00 | 30.00 | 1 | 5.00 | — | — | Ester | 5.00 | Melt kneading | 115 | 3 | 30 |
| 6 | 65.00 | 30.00 | 2 | 5.00 | — | — | Hydrocarbon | 5.00 | Melt kneading | 116 | 3 | 30 |
| 7 | 65.00 | 30.00 | 3 | 5.00 | — | — | Hydrocarbon | 5.00 | Melt kneading | 115 | 3 | 30 |
| 8 | 65.00 | 30.00 | 4 | 5.00 | — | — | Hydrocarbon | 5.00 | Melt kneading | 115 | 3 | 30 |
| 9 | 65.00 | 30.00 | 5 | 5.00 | — | — | Hydrocarbon | 5.00 | Melt kneading | 116 | 3 | 30 |
| 10 | 65.00 | 30.00 | 6 | 5.00 | — | — | Hydrocarbon | 5.00 | Melt kneading | 115 | 3 | 30 |
| 11 | 65.00 | 30.00 | 7 | 5.00 | — | — | Hydrocarbon | 5.00 | Melt kneading | 115 | 3 | 30 |
| 12 | 65.00 | 30.00 | 8 | 5.00 | — | — | Hydrocarbon | 5.00 | Melt kneading | 115 | 3 | 30 |
| 13 | 65.00 | 30.00 | 9 | 5.00 | — | — | Hydrocarbon | 5.00 | Melt kneading | 115 | 3 | 30 |
| 14 | 65.00 | 30.00 | 10 | 5.00 | — | — | Hydrocarbon | 5.00 | Melt kneading | 115 | 3 | 30 |
| 15 | 65.00 | 30.00 | 11 | 5.00 | — | — | Hydrocarbon | 5.00 | Melt kneading | 115 | 3 | 30 |
| 16 | 65.00 | 30.00 | 12 | 5.00 | — | — | Hydrocarbon | 5.00 | Melt kneading | 115 | 3 | 30 |
| 17 | 65.00 | 30.00 | 13 | 5.00 | — | — | Hydrocarbon | 5.00 | Melt kneading | 115 | 5 | 35 |
| 18 | 65.00 | 30.00 | 13 | 5.00 | — | — | Hydrocarbon | 5.00 | Melt kneading | 115 | 3 | 30 |
| 19 | 65.00 | 30.00 | 13 | 5.00 | — | — | Hydrocarbon | 5.00 | Melt kneading | 130 | 3 | 20 |
| 20 | 65.00 | 30.00 | 13 | 5.00 | — | — | Hydrocarbon | 5.00 | Melt kneading | 150 | 3 | 10 |
| 21 | 65.00 | 30.00 | 14 | 5.00 | — | — | Hydrocarbon | 5.00 | Melt kneading | 115 | 3 | 30 |
| 22 | 65.00 | 30.00 | 15 | 5.00 | — | — | Hydrocarbon | 5.00 | Melt kneading | 115 | 3 | 30 |
| 23 | 65.00 | 30.00 | 16 | 5.00 | — | — | Hydrocarbon | 5.00 | Melt kneading | 115 | 3 | 30 |
| 24 | 65.00 | 30.00 | 17 | 5.00 | — | — | Hydrocarbon | 5.00 | Melt kneading | 115 | 3 | 30 |
| 25 | 65.00 | 30.00 | 18 | 5.00 | — | — | Hydrocarbon | 5.00 | Melt kneading | 115 | 3 | 30 |
| 26 | 65.00 | 30.00 | 19 | 5.00 | — | — | Hydrocarbon | 5.00 | Melt kneading | 115 | 3 | 30 |
| 27 | 68.30 | 31.50 | 13 | 0.20 | — | — | Hydrocarbon | 5.00 | Melt kneading | 115 | 3 | 30 |
| 28 | 67.10 | 30.90 | 13 | 2.00 | — | — | Hydrocarbon | 5.00 | Melt kneading | 115 | 3 | 30 |
| 29 | 62.30 | 28.70 | 13 | 8.00 | — | — | Hydrocarbon | 5.00 | Melt kneading | 115 | 3 | 30 |
| 30 | 54.70 | 25.30 | 13 | 5.00 | Amorphous vinyl resin 1 | 15.00 | Hydrocarbon | 5.00 | Melt kneading | 115 | 3 | 30 |
| 31 | 41.10 | 18.90 | 13 | 5.00 | Amorphous vinyl resin 1 | 35.00 | Hydrocarbon | 5.00 | Melt kneading | 115 | 3 | 30 |
| 32 | 68.39 | 31.57 | 13 | 0.04 | — | — | Hydrocarbon | 5.00 | Melt kneading | 115 | 3 | 30 |
| 33 | 60.20 | 27.80 | 13 | 12.00 | — | — | Hydrocarbon | 5.00 | Melt kneading | 115 | 3 | 30 |
| 34 | 65.00 | 30.00 | 20 | 5.00 | — | — | Hydrocarbon | 5.00 | Melt kneading | 115 | 3 | 30 |
| 35 | 65.00 | 30.00 | 21 | 5.00 | — | — | Hydrocarbon | 5.00 | Melt kneading | 115 | 3 | 30 |
| 36 | 65.00 | 30.00 | 22 | 5.00 | — | — | Hydrocarbon | 5.00 | Melt kneading | 115 | 3 | 30 |
| 37 | 65.00 | 30.00 | 13 | 5.00 | — | — | Hydrocarbon | 5.00 | Melt kneading | 160 | 2.5 | 5 |
| 38 | 65.00 | 30.00 | 23 | 5.00 | — | — | Hydrocarbon | 5.00 | Melt kneading | 115 | 3 | 30 |

In the table, rotational speed means screw rotational speed.

TABLE 5

| | | Physical properties | | | | | | | | |
|---|---|---|---|---|---|---|---|---|---|---|
| | | | | | | | | | Circle-equivalent diameter µm | |
| Toner No. | Toner particle No. | D4 µm | Proportion of polymer A in domain A mass % | Proportion of wax in domain B mass % | Overall areal ratio of domain A and domain B among all domains % | Areal proportion of domains among cross-sectional area of toner % | Wa + Ww | Wa − Ww | Domain A | Domain B |
| 1 | 1 | 6.1 | 93 | 94 | 98 | 14 | 9.65 | 0.15 | 0.3 | 0.4 |
| 2 | 2 | 6.1 | 91 | 90 | 95 | 11 | 9.65 | 0.15 | 0.3 | 0.4 |
| 3 | 3 | 6.1 | 90 | 87 | 97 | 13 | 9.65 | 0.15 | 0.3 | 0.4 |
| 4 | 4 | 6.1 | 88 | 85 | 93 | 11 | 9.65 | 0.15 | 0.3 | 0.4 |
| 5 | 5 | 6.1 | 90 | 84 | 91 | 7 | 9.65 | 0.15 | 0.3 | 0.3 |
| 6 | 6 | 6.1 | 91 | 90 | 95 | 12 | 9.65 | 0.15 | 0.3 | 0.2 |
| 7 | 7 | 6.1 | 92 | 90 | 95 | 12 | 9.65 | 0.15 | 0.3 | 0.4 |
| 8 | 8 | 6.1 | 91 | 90 | 94 | 12 | 9.65 | 0.15 | 0.3 | 0.1 |
| 9 | 9 | 6.1 | 89 | 90 | 94 | 12 | 9.65 | 0.15 | 0.3 | 0.3 |
| 10 | 10 | 6.1 | 89 | 90 | 96 | 12 | 9.65 | 0.15 | 0.3 | 0.4 |
| 11 | 11 | 6.1 | 87 | 90 | 96 | 12 | 9.65 | 0.15 | 0.3 | 0.7 |
| 12 | 12 | 6.1 | 91 | 90 | 95 | 12 | 9.65 | 0.15 | 0.3 | 0.4 |
| 13 | 13 | 6.1 | 91 | 90 | 95 | 12 | 9.65 | 0.15 | 0.3 | 0.4 |
| 14 | 14 | 6.1 | 91 | 90 | 95 | 12 | 9.65 | 0.15 | 0.3 | 0.4 |

TABLE 5-continued

| | Toner | | Physical properties | | | | | | | |
|---|---|---|---|---|---|---|---|---|---|---|
| | | | Proportion of polymer A | Proportion of wax | Overall areal ratio of domain A and domain B | Areal proportion of domains among cross-sectional area | | | Circle-equivalent diameter μm | |
| Toner No. | particle No. | D4 μm | in domain A mass % | in domain B mass % | among all domains % | of toner % | Wa + Ww | Wa − Ww | Domain A | Domain B |
| 15 | 15 | 6.1 | 88 | 90 | 95 | 12 | 9.65 | 0.15 | 0.3 | 0.4 |
| 16 | 16 | 6.1 | 88 | 88 | 93 | 12 | 9.65 | 0.15 | 0.3 | 0.4 |
| 17 | 17 | 6.1 | 90 | 90 | 92 | 13 | 9.65 | 0.15 | 0.3 | 0.4 |
| 18 | 18 | 6.1 | 90 | 90 | 91 | 12 | 9.65 | 0.15 | 0.3 | 0.4 |
| 19 | 19 | 6.1 | 88 | 88 | 88 | 11 | 9.65 | 0.15 | 0.2 | 0.4 |
| 20 | 20 | 6.1 | 81 | 81 | 85 | 10 | 9.65 | 0.15 | 0.1 | 0.4 |
| 21 | 21 | 6.1 | 92 | 90 | 88 | 12 | 9.65 | 0.15 | 0.6 | 0.4 |
| 22 | 22 | 6.1 | 88 | 88 | 88 | 12 | 9.65 | 0.15 | 0.6 | 0.4 |
| 23 | 23 | 6.1 | 88 | 86 | 88 | 12 | 9.65 | 0.15 | 0.6 | 0.4 |
| 24 | 24 | 6.1 | 84 | 87 | 88 | 12 | 9.65 | 0.15 | 0.6 | 0.4 |
| 25 | 25 | 6.1 | 88 | 87 | 88 | 13 | 9.65 | 0.15 | 0.6 | 0.4 |
| 26 | 26 | 6.1 | 84 | 85 | 88 | 13 | 9.65 | 0.15 | 0.6 | 0.4 |
| 27 | 27 | 6.1 | 84 | 92 | 88 | 6 | 4.95 | −4.55 | 0.7 | 0.6 |
| 28 | 28 | 6.1 | 86 | 91 | 88 | 9 | 6.71 | −2.79 | 0.8 | 0.4 |
| 29 | 29 | 6.1 | 88 | 90 | 88 | 17 | 12.59 | 3.09 | 0.5 | 0.4 |
| 30 | 30 | 6.1 | 90 | 90 | 88 | 14 | 9.65 | 0.15 | 0.5 | 0.7 |
| 31 | 31 | 6.1 | 92 | 90 | 88 | 15 | 9.65 | 0.15 | 0.5 | 0.9 |
| 32 | 32 | 6.1 | 82 | 95 | 88 | 4 | 4.79 | −4.71 | 0.5 | 0.4 |
| 33 | 33 | 6.1 | 83 | 83 | 88 | 18 | 16.51 | 7.01 | 0.5 | 0.4 |
| 34 | 34 | 6.1 | 87 | 90 | 88 | 12 | 9.65 | 0.15 | 0.5 | 0.4 |
| 35 | 35 | 6.1 | 88 | 92 | 88 | 12 | 9.65 | 0.15 | 0.5 | 0.4 |
| 36 | 36 | 6.1 | (60) | (40) | 0 | 10 | 9.65 | 0.15 | 0.5 | 0.4 |
| 37 | 37 | 6.1 | (72) | (74) | 0 | 10 | 9.65 | 0.15 | 0.5 | 0.4 |
| 38 | 38 | 6.1 | (50) | (50) | 0 | 10 | 9.65 | 0.15 | 0.5 | 0.4 |

In the table, values for the proportion of the polymer A in domain A and the proportion of the wax in domain B are arithmetic mean values for 10 domains. Circle-equivalent diameters are number-average values.

In the table, domains in toners 36 to 38 were such that the proportion of the polymer A or the proportion of the wax was less than 80%, and were therefore not domain A or domain B, but have been listed as such for the sake of convenience.

Production Example of Magnetic Carrier 1

Magnetite 1: number average particle diameter: 0.30 μm (intensity of magnetization in a magnetic field of 1000/4n (kA/m): 65 $Am^2/kg$)

Magnetite 2; number average particle diameter 0.50 μm (intensity of magnetization in a magnetic field of 1000/4π (kA/m): 65 $Am^2/kg$)

4.0 parts of a silane compound (3-(2-aminoethylamino-propyl)trimethoxysilane) was added to 100 parts of each of the materials listed above, and subjected to high speed mixing and agitation at a temperature of at least 100° C. in a container so as to treat the fine particles.

Phenol: 10 mass %

Formaldehyde solution: 6 mass %

(formaldehyde 40 mass %, methanol 10 mass %, water 50 mass %)

Magnetite 1 treated with the silane compound mentioned above: 58 mass %

Magnetite 2 treated with the silane compound mentioned above: 26 mass %

100 parts of the materials listed above, 5 parts of a 28 mass % aqueous solution of ammonia and 20 parts of water were placed in a flask, the temperature was increased to 85° C. over a period of 30 minutes and held at this temperature for a period of 3 hours while agitating and mixing, a polymerization reaction was carried out, and the obtained phenol resin was cured.

The cured phenol resin was then cooled to 30° C., water was added, the supernatant liquid was removed, and the obtained precipitate was washed with water and air dried. Next, spherical magnetic carrier 1 was obtained in the form of a magnetic material dispersion by drying the precipitate at a temperature of 60'C under reduced pressure (not more than 5 mm Hg). The 50% particle diameter on a volume basis (D50) was 34.21 μm.

Production Example of Two Component Developer 1

A two component developer 1 was obtained by mixing 92.0 parts of the magnetic carrier 1 and 8.0 parts of the toner 1 using a V type mixer (a V-20 produced by Seishin Enterprise Co., Ltd.).

Production Examples of Two Component Developers 2 to 38

Two component developers 2 to 38 were obtained using a similar procedure to that used in the production example of two component developer 1, except that the formulation was altered in the manner shown in Table 6.

TABLE 6

| Two component developer | Toner particle | Carrier |
|---|---|---|
| Two component developer 1 | Toner 1 | Carrier 1 |
| Two component developer 2 | Toner 2 | Carrier 1 |
| Two component developer 3 | Toner 3 | Carrier 1 |
| Two component developer 4 | Toner 4 | Carrier 1 |
| Two component developer 5 | Toner 5 | Carrier 1 |
| Two component developer 6 | Toner 6 | Carrier 1 |
| Two component developer 7 | Toner 7 | Carrier 1 |
| Two component developer 8 | Toner 8 | Carrier 1 |
| Two component developer 9 | Toner 9 | Carrier 1 |

TABLE 6-continued

| Two component developer | Toner particle | Carrier |
|---|---|---|
| Two component developer 10 | Toner 10 | Carrier 1 |
| Two component developer 11 | Toner 11 | Carrier 1 |
| Two component developer 12 | Toner 12 | Carrier 1 |
| Two component developer 13 | Toner 13 | Carrier 1 |
| Two component developer 14 | Toner 14 | Carrier 1 |
| Two component developer 15 | Toner 15 | Carrier 1 |
| Two component developer 16 | Toner 16 | Carrier 1 |
| Two component developer 17 | Toner 17 | Carrier 1 |
| Two component developer 18 | Toner 18 | Carrier 1 |
| Two component developer 19 | Toner 19 | Carrier 1 |
| Two component developer 20 | Toner 20 | Carrier 1 |
| Two component developer 21 | Toner 21 | Carrier 1 |
| Two component developer 22 | Toner 22 | Carrier 1 |
| Two component developer 23 | Toner 23 | Carrier 1 |
| Two component developer 24 | Toner 24 | Carrier 1 |
| Two component developer 25 | Toner 25 | Carrier 1 |
| Two component developer 26 | Toner 26 | Carrier 1 |
| Two component developer 27 | Toner 27 | Carrier 1 |
| Two component developer 28 | Toner 28 | Carrier 1 |
| Two component developer 29 | Toner 29 | Carrier 1 |
| Two component developer 30 | Toner 30 | Carrier 1 |
| Two component developer 31 | Toner 31 | Carrier 1 |
| Two component developer 32 | Toner 32 | Carrier 1 |
| Two component developer 33 | Toner 33 | Carrier 1 |
| Two component developer 34 | Toner 34 | Carrier 1 |
| Two component developer 35 | Toner 35 | Carrier 1 |
| Two component developer 36 | Toner 36 | Carrier 1 |
| Two component developer 37 | Toner 37 | Carrier 1 |
| Two component developer 38 | Toner 38 | Carrier 1 |

Example 1

Evaluations were carried out using two component developer 1.

Using a modified imagePRESS C800 produced by Canon Inc. as an image forming apparatus, two component developer 1 was placed in the cyan developing device. The apparatus was modified so that the fixation temperature, the processing speed, the direct current voltage $V_{DC}$ of the developer bearing member, the charging voltage $V_D$ of the electrostatic latent image bearing member and the laser power could be freely set. Image output evaluations were carried out by outputting FFh images (solid images) having a prescribed image ratio, adjusting $V_{DC}$, $V_D$ and laser power so that the toner laid-on levels of FFh images on the paper were prescribed values, and carrying out the evaluations described below.

FFh is a value that indicates 256 colors as 16 binary numbers, with 00h denoting the 1st gradation of 256 colors (a white background part), and FFh denoting the 256th of 256 colors (a solid part).

Evaluations were carried out on the basis of the evaluation methods described below, and the results are shown in Table 7.

Low-temperature Fixability

Paper: GFC-081 (81.0 g/m$^2$)

(sold by Canon Marketing Japan K.K.)

Toner laid-on level on paper: 0.55 mg/cm$^2$ (Adjusted by altering the direct current voltage $V_{DC}$ of the developer bearing member, the charging voltage $V_D$ of the electrostatic latent image bearing member and the laser power)

Evaluation image: An image measuring 2 cm×5 cm was disposed in the center of an A4 sheet of the paper mentioned above Test environment: Low temperature low humidity environment (temperature: 15° C., humidity: 10% RH) (hereinafter abbreviated to "L/L")

Fixation temperature: 140° C.

Processing speed: 360 mm/sec

The evaluation image mentioned above was outputted and low-temperature fixability was evaluated. The image density decrease rate was used as an indicator for evaluating low-temperature fixability.

The image density decrease rate is first measured for image density in a central part of an image using an X-Rite color reflection densitometer (500 Series produced by X-Rite). Next, the fixed image on the part whose image density has been measured is rubbed (back and forth five times) with a lens-cleaning paper while applying a load of 4.9 kPa (50 g/cm$^2$), after which the image density is measured again.

Next, the rate of decrease in image density before and after the rubbing was calculated using the formula below. The obtained image density decrease rate was evaluated according to the evaluation criteria shown below. Evaluations of A to C were assessed as being good.

$$\text{Image density decrease rate}=(\text{image density before rubbing}-\text{image density after rubbing})/(\text{image density before rubbing})\times 100$$

Evaluation Criteria

A: Image density decrease rate of less than 3%

B: Image density decrease rate of at least 3% but less than 5%

C: Image density decrease rate of at least 5% but less than 8%

D: Image density decrease rate of at least 8%

Resistance to Wraparound

Paper: CS-064 (64.0 g/m$^2$)

(sold by Canon Marketing Japan K.K.)

Toner laid-on level on paper: 0.55 mg/cm$^2$ (Adjusted by altering the direct current voltage $V_{DC}$ of the developer bearing member, the charging voltage $V_D$ of the electrostatic latent image bearing member and the laser power)

Evaluation image: An image measuring 2 cm×20 cm was disposed at the long edge in the paper passing direction an A4 sheet of the paper mentioned above in such a way as to leave a margin of 2 mm from the edge of the paper Test environment: High temperature high humidity environment (temperature: 30° C., humidity: 80% RH (hereinafter abbreviated to H/H))

Fixation temperature: Temperature increase in increments of 5° C. from 140° C.

Processing speed: 360 mm/sec

The evaluation image mentioned above was outputted, and resistance to wraparound was evaluated on the basis of the criteria below in terms of the maximum fixation temperature at which wraparound did not occur. Evaluations of A to C were assessed as being good.

Evaluation Criteria

A: At least 165° C.

B: At least 155° C. but lower than 165° C.

C: At least 145° C. but lower than 155° C.

D: Lower than 145° C.

Image Bending Resistance

Paper: Oce Top Coated Pro Silk 270 (270.0 g/m$^2$) (sold by Oce)

Toner laid-on level on paper: 0.55 mg/cm$^2$ (Adjusted by altering the direct current voltage $V_{DC}$ of the developer bearing member, the charging voltage $V_D$ of the electrostatic latent image bearing member and the laser power)

Evaluation image: An image measuring 15 cm×15 cm was disposed in the center of a sheet of the paper mentioned above Fixing test environment: Normal temperature normal humidity environment (temperature: 23° C., humidity: 50% RH) (hereinafter abbreviated to "N/N")

Fixation temperature: 180° C.

Processing speed: 360 mm/sec

The evaluation image mentioned above was outputted and left to stand for 1 day in a normal temperature normal humidity environment, after which image bending resistance was evaluated using the method described below.

First, a test piece having a size of 5 cm×10 cm was cut from the evaluation image. Using a mandrel bending tester (KT-SP1820 produced by Cotec) for a sample, the test piece was fixed so that the image part was on the opposite side from a mandrel having a diameter of 2 mm. Over a period of 2 seconds, a handle was pulled and the test piece was bent 180°. Next, a load of 4.9 kPa (50 $g/cm^2$) was placed on the bent image part, and the fixed image was rubbed back and forth 5 times using a carbon paper.

The bent image part was read using a scanner, binarization was performed on a region measuring 5 mm×5 mm, and the areal ratio of a white background part was evaluated using the following evaluation criteria. Evaluations of A to C were assessed as being good.

Evaluation Criteria

A: Areal ratio of white background part: less than 2%

B: Areal ratio of white background part: at least 2% but less than 5%

C: Areal ratio of white background part: at least 5% but less than 10%

D: Areal ratio of white background part: at least 10%

Charge Rising Performance in Normal Temperature Low Humidity Environment

Evaluation of charge rising performance was carried out by measuring changes in density when images having different image print coverage rates were outputted. An image having a low image ratio is outputted, the charge on a toner in the developing machine is saturated, and an image having a high image ratio is then outputted. Therefore, a change in density occurs as a result of differences in charge between a charge-saturated toner in the developing machine and a toner freshly supplied to the developing machine.

A toner having rapid charge rising performance becomes charge-saturated immediately after being supplied to the developing machine, and therefore undergoes little change in density. However, a toner having slow charge rising performance requires time to become charge-saturated after being supplied to the developing machine, meaning that the charge amount of the overall toner decreases and changes in density occur.

Using an imagePress C800 full color copier produced by Canon as an image forming apparatus, a two component developer to be evaluated was placed in the cyan developing device of the image forming apparatus, and a toner to be evaluated was placed in the cyan toner container and subjected to the following evaluations.

A modification was made such that the mechanism for discharging excess magnetic carrier in the developing device from the developing device was removed. GF-C081 ordinary paper (A4, basis weight 81.4 $g/m^2$, sold by Canon Marketing Japan) was used as the evaluation paper.

Adjustments were made so that the toner mounting amount on a paper for an FFh image (a solid image) was 0.45 $mg/cm^2$. FFh is a value that indicates 256 colors as 16 binary numbers, with 00h denoting the 1st gradation of 256 colors (a white background part), and FF denoting the 256th gradation of 256 colors (a solid part).

Firstly, an image output test was conducted by printing 1000 prints at an image ratio of 1%. While continuously feeding 1000 sheets of paper, paper feeding was carried out under the same developing conditions and transfer conditions (no calibration) as those used when printing the first print.

Next, an image output test was conducted by printing 1000 prints at an image ratio of 80%. While continuously feeding 1000 sheets of paper, paper feeding was carried out under the same developing conditions and transfer conditions (no calibration) as those used when printing the first print.

The image density of the 1000th print printed at an image ratio of 1% was taken to be the initial density, and the density of the 1000th image printed at an image ratio of 80% was measured and evaluated according to the criteria shown below.

These tests were carried out in a normal temperature low humidity environment (N/L; temperature 23° C., relative humidity 5%).

(Measurement of Change in Image Density)

Using an X-Rite color reflection densitometer (500 Series produced by X-Rite), the initial density and the density of the 1000th print printed at an image ratio of 80% were measured, and the difference in image density was ranked according to the following criteria. Evaluations of at least C were assessed as being good.

Evaluation Criteria

A: Density difference: less than 0.02

B: Density difference: at least 0.02 but less than 0.05

C: Density difference: at least 0.05 but less than 0.10

D: Density difference: at least 0.10

Examples 2 to 31 and Comparative Examples 1 to 7

Evaluations were carried out in the same way as for Example 1, except that two component developers 2 to 37 were used instead of two component developer 1. The evaluation results are shown in Table 7.

TABLE 7

| | | Low-temperature fixability | | Resistance to wraparound | | Bending strength | | Charge rising performance | |
|---|---|---|---|---|---|---|---|---|---|
| Example | Toner | Density decrease rate (%) | Rank | Temperature (° C.) | Rank | Areal ratio of white background part (%) | Rank | Density difference (Δ) | Rank |
| Example 1 | Toner 1 | 1 | A | 180 | A | 1 | A | 0.01 | A |
| Example 2 | Toner 2 | 2 | A | 175 | A | 3 | B | 0.01 | A |
| Example 3 | Toner 3 | 1 | A | 175 | A | 1 | A | 0.01 | A |

TABLE 7-continued

| Example | Toner | Low-temperature fixability: Density decrease rate (%) | Rank | Resistance to wraparound: Temperature (° C.) | Rank | Bending strength: Areal ratio of white background part (%) | Rank | Charge rising performance: Density difference (Δ) | Rank |
|---|---|---|---|---|---|---|---|---|---|
| Example 4 | Toner 4 | 2 | A | 170 | A | 3 | B | 0.01 | A |
| Example 5 | Toner 5 | 2 | A | 145 | C | 4 | B | 0.01 | A |
| Example 6 | Toner 6 | 2 | A | 175 | A | 3 | B | 0.01 | A |
| Example 7 | Toner 7 | 2 | A | 175 | A | 3 | B | 0.01 | A |
| Example 8 | Toner 8 | 2 | A | 175 | A | 3 | B | 0.01 | A |
| Example 9 | Toner 9 | 2 | A | 175 | A | 3 | B | 0.01 | A |
| Example 10 | Toner 10 | 2 | A | 175 | A | 3 | B | 0.01 | A |
| Example 11 | Toner 11 | 2 | A | 175 | A | 3 | B | 0.03 | B |
| Example 12 | Toner 12 | 2 | A | 175 | A | 3 | B | 0.01 | A |
| Example 13 | Toner 13 | 6 | C | 175 | A | 3 | B | 0.01 | A |
| Example 14 | Toner 14 | 2 | A | 175 | A | 3 | B | 0.01 | A |
| Example 15 | Toner 15 | 2 | A | 175 | A | 3 | B | 0.01 | A |
| Example 16 | Toner 16 | 2 | A | 160 | B | 3 | B | 0.01 | A |
| Example 17 | Toner 17 | 2 | A | 160 | B | 3 | B | 0.04 | B |
| Example 18 | Toner 18 | 2 | A | 160 | B | 4 | B | 0.04 | B |
| Example 19 | Toner 19 | 2 | A | 160 | B | 7 | C | 0.04 | B |
| Example 20 | Toner 20 | 2 | A | 150 | C | 9 | C | 0.04 | B |
| Example 21 | Toner 21 | 7 | C | 160 | B | 7 | C | 0.04 | B |
| Example 22 | Toner 22 | 2 | A | 160 | B | 7 | C | 0.04 | B |
| Example 23 | Toner 23 | 2 | A | 155 | B | 8 | C | 0.04 | B |
| Example 24 | Toner 24 | 2 | A | 150 | C | 8 | C | 0.04 | B |
| Example 25 | Toner 25 | 2 | A | 155 | B | 8 | C | 0.04 | B |
| Example 26 | Toner 26 | 6 | C | 160 | B | 9 | C | 0.04 | B |
| Example 27 | Toner 27 | 6 | C | 160 | B | 8 | C | 0.04 | B |
| Example 28 | Toner 28 | 4 | B | 160 | B | 8 | C | 0.04 | B |
| Example 29 | Toner 29 | 2 | A | 150 | C | 8 | C | 0.04 | B |
| Example 30 | Toner 30 | 2 | A | 160 | B | 7 | C | 0.04 | B |
| Example 31 | Toner 31 | 2 | A | 160 | B | 7 | C | 0.04 | B |
| Comparative example 1 | Toner 32 | 12 | D | 160 | B | 8 | C | 0.04 | B |
| Comparative example 2 | Toner 33 | 2 | A | 140 | D | 12 | D | 0.04 | B |
| Comparative example 3 | Toner 34 | 2 | A | 150 | C | 11 | D | 0.04 | B |
| Comparative example 4 | Toner 35 | 10 | D | 160 | B | 12 | D | 0.04 | B |
| Comparative example 5 | Toner 36 | 2 | A | 135 | D | 15 | D | 0.04 | B |
| Comparative example 6 | Toner 37 | 2 | A | 135 | D | 15 | D | 0.07 | C |
| Comparative example 7 | Toner 38 | 2 | A | 135 | D | 18 | D | 0.11 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-037683, filed Mar. 5, 2020 which is hereby incorporated by reference herein in its entirety.

What is claimed is:

1. A toner, comprising:

a toner particle comprising a binder resin and a wax, the binder resin comprising an amorphous polyester resin and a polymer A;

a content of the amorphous polyester resin in the binder resin being at least 50.00 mass %, and a content of polymer A in the binder resin being 0.10 to 10.00 mass %;

polymer A comprising a first monomer unit comprising a structure represented by formula (1) and a second monomer unit that is different from the first monomer unit

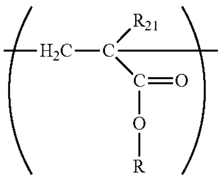

(1)

where $R_{Z1}$ denotes a hydrogen atom or a methyl group, and R denotes an alkyl group comprising 18 to 36 carbon atoms;

the second monomer unit being represented by formula (2)

(2)

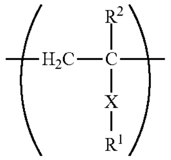

where X denotes a single bond or an alkylene group comprising 1 to 6 carbon atoms, $R^1$ is —$COOR^{11}$ ($R^{11}$ denotes a hydroxyalkyl group comprising 1 to 6 carbon atoms), and $R^2$ denotes a hydrogen atom or a methyl group;

a content ratio of the first monomer unit in polymer A being 5.0 to 60.0 mol % relative to a total number of moles of all monomer units in polymer A, wherein a matrix-domain structure comprising a matrix comprising the amorphous polyester resin and domains is present in an observation of a cross section of the toner, the domains comprising a domain A comprising at least 80 mass % of the polymer A and a domain B comprising at least 80 mass % of the wax, the number-average value of the circle-equivalent diameter of domain A is to 0.8 μm, and the number-average value of the circle-equivalent diameter of domain B is 0.1 to 1.0 μm, and Wa+Ww is 3.00 to 20.00 and Wa−Ww is not more than 5.00 when Wa (mass %) is a content of the polymer A in the toner particle and Ww (mass %) is a content of the wax in the toner particle.

2. The toner according to claim 1, wherein an overall areal ratio of the domain A and the domain B relative to an area of the domains is at least 50%.

3. The toner according to claim 1, wherein an overall areal ratio of the domain A and the domain B relative to an area of the domains is at least 90%.

4. The toner according to claim 1, wherein a content ratio of the second monomer unit is 20.0 to 95.0 mol % relative to the total number of moles of all monomer units in the polymer A, and $SP_{21}$ is at least 21.00 when $SP_{21}$ is an SP value $(J/cm^3)^{0.5}$ of the second monomer unit.

5. The toner according to claim 1, wherein the wax comprises a hydrocarbon wax.

6. The toner according to claim 1, wherein polymer A is a vinyl polymer.

7. A method for producing a toner, comprising the steps of:

a step of melt kneading raw materials comprising a binder resin and a wax; and a step of pulverizing an obtained melt-kneaded product, wherein the toner comprises a toner particle comprising the binder resin and the wax, the binder resin comprising an amorphous polyester resin and a polymer A, a content of the amorphous polyester resin in the binder resin is at least mass %, and a content of polymer A in the binder resin is 0.10 to 10.00 mass %, polymer A comprises a first monomer unit comprising a structure represented by formula (1) and a second monomer unit that is different from the first monomer unit (1)

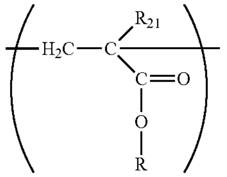

where $R_{Z1}$ denotes a hydrogen atom or a methyl group, and R denotes an alkyl group comprising 18 to 36 carbon atoms, the second monomer unit being represented by formula (2)

(2)

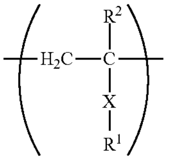

where X denotes a single bond or an alkylene group comprising 1 to 6 carbon atoms, $R^1$ is —$COOR^{11}$ ($R^{11}$ denotes a hydroxyalkyl group comprising 1 to 6 carbon atoms), and $R^2$ denotes a hydrogen atom or a methyl group;

a content ratio of the first monomer unit in polymer A is 5.0 to 60.0 mol % relative to a total number of moles of all monomer units in polymer A, a matrix-domain structure comprising a matrix comprising the amorphous polyester resin and domains is present in an observation of a cross section of the toner, the domains comprising a domain A comprising at least 80 mass % of the polymer A and a domain B comprising at least 80 mass % of the wax, the number-average value of the circle-equivalent diameter of domain A is 0.1 to 0.8 μm, and the number-average value of the circle-equivalent diameter of domain B is 0.1 to 1.0 μm, and Wa+Ww is 3.00 to 20.00 and Wa−Ww is not more than 5.00 when Wa (mass %) is a content of the polymer A in the toner particle and Ww (mass %) is a content of the wax in the toner particle.

8. The method for producing a toner according to claim 7, wherein the step of melt kneading the raw materials comprises:

a first melt kneading step of melt kneading the amorphous polyester resin and the wax to obtain a first melt-kneaded product; a first pulverizing step of pulverizing the first melt-kneaded product to obtain a first powder; and a second melt kneading step of melt kneading at least the first powder and the polymer A to obtain a second melt-kneaded product, and the step of pulverizing the melt-kneaded product is a step of pulverizing the second melt-kneaded product.

9. A method for producing a toner, comprising the steps of:

a step of preparing fine particle-dispersed solutions of each raw materials of the toner;

a step of mixing the fine particle-dispersed solutions of each raw materials and adding a flocculant to form aggregate particles; and a step of heating and fusing the aggregate particles, wherein the toner comprises a toner particle comprising the binder resin and the wax, the binder resin comprising an amorphous polyester resin and a polymer A, a content of the amorphous polyester resin in the binder resin is at least 50.00 mass %, and a content of polymer A in the binder resin is 0.10 to 10.00 mass %, polymer A comprises a first monomer unit comprising a structure represented by formula (1) and a second monomer unit that is different from the first monomer unit (1)

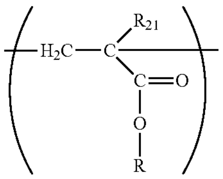

where $R_{Z1}$ denotes a hydrogen atom or a methyl group, and R denotes an alkyl group comprising 18 to 36 carbon atoms, the second monomer unit being represented by formula (2)

(2)

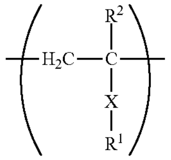

where X denotes a single bond or an alkylene group comprising 1 to 6 carbon atoms, $R^1$ is —$COOR^{11}$ ($R^{11}$ denotes a hydroxyalkyl group comprising 1 to 6 carbon atoms), and $R^2$ denotes a hydrogen atom or a methyl group;

a content ratio of the first monomer unit in polymer A is 5.0 to 60.0 mol % relative to a total number of moles of all monomer units in polymer A, a matrix-domain structure comprising a matrix comprising the amorphous polyester resin and domains is present in an observation of a cross section of the toner, the domains comprising a domain A comprising at least 80 mass % of the polymer A and a domain B comprising at least 80 mass % of the wax, the number-average value of the circle-equivalent diameter of domain A is 0.1 to 0.8 μm, and the number-average value of the circle-equivalent diameter of domain B is 0.1 to 1.0 μm, and Wa+Ww is 3.00 to 20.00 and Wa−Ww is not more than 5.00 when Wa (mass %) is a content of the polymer A in the toner particle and Ww (mass %) is a content of the wax in the toner particle.

10. The toner production method according to claim 9, wherein the step of preparing fine particle-dispersed solutions of each raw materials comprises:

a step of obtaining a first fine particle-dispersed solution comprising the amorphous polyester resin and the wax; and a step of obtaining a second fine particle-dispersed solution comprising the polymer A, and the step of forming the aggregate particles is a step of mixing the first fine particle-dispersed solution and the second fine particle-dispersed solution and adding the flocculant to form aggregate particles.

11. The toner according to claim 1, wherein the content of the amorphous polyester resin in the binder resin is at least 75.00 mass %.

12. The toner according to claim 1, wherein the content of the amorphous polyester resin in the resin is at least 90.00 mass %.

13. The toner according to claim 1, wherein the second monomer unit is derived from 2-hydroxyethyl (meth)acrylate or 2-hydroxypropyl (meth)acrylate.

14. The toner according to claim 1, wherein the second monomer unit is derived from 2-hydroxyethyl methacrylate.

* * * * *